US012764474B2

(12) United States Patent
Ham et al.

(10) Patent No.: US 12,764,474 B2

(45) Date of Patent: Oct. 13, 2026

(54) VIBRATION APPARATUS AND VEHICULAR APPARATUS COMPRISING THE SAME

(71) Applicant: LG Display Co., Ltd., Seoul (KR)

(72) Inventors: Yong-Su Ham, Paju-si (KR); SeungRyull Park, Paju-si (KR); Chiwan Kim, Paju-si (KR)

(73) Assignee: LG DISPLAY CO., LTD., Seoul (KR)

(*) Notice: Subject to any disclaimer, the term of this patent is extended or adjusted under 35 U.S.C. 154(b) by 137 days.

(21) Appl. No.: 18/907,304

(22) Filed: Oct. 4, 2024

(65) Prior Publication Data

US 2025/0119694 A1 Apr. 10, 2025

(30) Foreign Application Priority Data

Oct. 6, 2023 (KR) ........................ 10-2023-0133540

(51) Int. Cl.
*H04R 17/00* (2006.01)
*H04R 1/02* (2006.01)

(52) U.S. Cl.
CPC ............. *H04R 17/00* (2013.01); *H04R 1/023* (2013.01); *H04R 2499/13* (2013.01); *H04R 2499/15* (2013.01)

(58) Field of Classification Search
CPC ................................ H04R 17/00; H04R 1/023
See application file for complete search history.

(56) References Cited

U.S. PATENT DOCUMENTS

| | | | | |
|---|---|---|---|---|
| 11,166,108 B2* | 11/2021 | Kim | H10N 30/852 |
| 12,425,776 B2* | 9/2025 | Ryu | H04R 17/00 |
| 2020/0233629 A1* | 7/2020 | Yeon | G10K 9/125 |
| 2021/0304920 A1* | 9/2021 | Ko | G06F 3/016 |
| 2021/0352390 A1* | 11/2021 | Lee | B60R 11/0223 |
| 2022/0174398 A1* | 6/2022 | Ham | H04R 1/2811 |
| 2022/0201400 A1* | 6/2022 | Kho | H04R 17/00 |
| 2022/0217472 A1* | 7/2022 | Ye | H04R 17/00 |
| 2023/0121224 A1* | 4/2023 | Lee | B60R 11/0217 310/321 |
| 2023/0217184 A1* | 7/2023 | Nam | H04R 7/045 310/324 |
| 2023/0217186 A1* | 7/2023 | Kho | H04R 1/028 381/86 |

FOREIGN PATENT DOCUMENTS

| | | |
|---|---|---|
| KR | 10-2021-0121979 A | 10/2021 |
| TW | 202318688 A | 5/2023 |

* cited by examiner

*Primary Examiner* — Olisa Anwah

(74) *Attorney, Agent, or Firm* — Birch, Stewart, Kolasch & Birch, LLP

(57) ABSTRACT

A vibration apparatus can include a vibration member, and a vibration element configured to vibrate the vibration member and including a vibration part. The vibration part includes a piezoelectric material and an electrostrictive material. The electrostrictive material includes materials represented by Equations 1 and 2 below.

$$(Pb_{A-B}C_B)(Mg_{1/3}Nb_{2/3})_aO_3 \quad \text{[Equation 1]}$$

$$(Pb_{A-B}C_B)(D_{1/3}E_{2/3})_bO_3 \quad \text{[Equation 2]}$$

15 Claims, 7 Drawing Sheets

VIBRATION APPARATUS AND VEHICULAR APPARATUS COMPRISING THE SAME

CROSS-REFERENCE TO RELATED APPLICATIONS

This application claims priority to Korean Patent Application No. 10-2023-0133540, filed in the Republic of Korea on Oct. 6, 2023, the entirety of which is hereby expressly incorporated by reference into the present application.

BACKGROUND

Technical Field

The present disclosure relates to a vibration apparatus and a vehicular apparatus comprising the same.

Discussion of the Related Art

An apparatus includes a separate speaker or a vibration apparatus to provide sounds. When the speaker is disposed in the apparatus, a space occupied by the speaker can cause a limitation in design and spatial arrangement of the apparatus.

The speaker applied to the apparatus can be, for example, an actuator including a magnet and a coil. However, if the actuator is applied to the apparatus, there is a disadvantage in that the thickness of the apparatus can be thick. Accordingly, a piezoelectric element capable of implementing a thin thickness has been attracting attention.

The vibration apparatus including the piezoelectric element is used in various fields. For example, since the piezoelectric element does not have sufficient piezoelectric characteristics in applications requiring high temperature and the like, it can become difficult to secure reliability of the piezoelectric element.

SUMMARY OF THE DISCLOSURE

The inventors of the present disclosure have recognized these limitations described above and other limitations associated with the related art, and have performed various research and experiments for realizing an apparatus comprising a vibration apparatus capable of having improved piezoelectric characteristic. Based on the various research and experiments, the inventors of the present disclosure have invented an apparatus including a vibration apparatus capable of improving piezoelectric characteristics and improving sound characteristics and/or sound pressure characteristics.

One or more embodiments of the present disclosure are directed to providing a vibration apparatus which improves piezoelectric characteristics and improving sound characteristics and/or sound pressure characteristics and a vehicular apparatus comprising the same.

Additional features, advantages, and embodiments of the present disclosure are set forth in part in the present disclosure and will also be apparent from the present disclosure or can be learned by practice of the inventive concepts provided herein. Other features, advantages, and embodiments of the present disclosure can be realized and attained by the structure particularly pointed out in the present disclosure, or derivable therefrom, and claims hereof as well as the appended drawings.

To achieve these and other advantages and embodiments of the present disclosure, as embodied and broadly described herein, in one or more embodiments, an apparatus comprise a vibration member and a vibration element configured to vibrate the vibration member and to include a vibration part. The vibration part includes a piezoelectric material and an electrostrictive material, the electrostrictive material includes a material represented by Equations 1 and 2 below.

$$(Pb_{A-B}C_B)(Mg_{1/3}Nb_{2/3})_aO_3 \quad \text{[Equation 1]}$$

$$(Pb_{A-B}C_B)(D_{1/3}E_{2/3})_bO_3 \quad \text{[Equation 2]}$$

The piezoelectric material includes materials represented by Equations 3 and 4 below.

$$(Pb_{A-B}C_B)(Zr_c)O_3 \quad \text{[Equation 3]}$$

$$(Pb_{A-B}C_B)(Ti_d)O_3 \quad \text{[Equation 4]}$$

In Equation 1 to Equation 4, ‘C’ is one of calcium Ca, strontium Sr, and barium Ba, ‘D’ is one of nickel Ni, manganese Mn, magnesium Mg, and cobalt Co, ‘E’ is niobium Nb or tantalum Ta, and in Equation 1 to Equation 4, ‘a+b+c+d’ is equal to 1, and the ratio of ‘a+b’ and ‘c+d’ is 1.0:1.7 to 1.0:3.0.

A vehicular apparatus according to one or more embodiments of the present disclosure comprises an exterior material, an interior material covering the exterior material, and one or more sound generating apparatus configured to output sound from at least one of the exterior material and the interior material. The at least one sound generating apparatus includes a vibration apparatus. The vibration apparatus comprise a vibration member and a vibration element configured to vibrate the vibration member and to include a vibration part. The vibration part includes a piezoelectric material and an electrostrictive material, the electrostrictive material includes materials represented by Equations 1 and 2 below.

$$(Pb_{A-B}C_B)(Mg_{1/3}Nb_{2/3})_aO_3 \quad \text{[Equation 1]}$$

$$(Pb_{A-B}C_B)(D_{1/3}E_{2/3})_bO_3 \quad \text{[Equation 2]}$$

The piezoelectric material includes materials represented by Equations 3 and 4 below $$(Pb_{A-B}C_B)(Zr_c)O_3 \quad \text{[Equation 3]}$$

$$(Pb_{A-B}C_B)(Ti_d)O_3 \quad \text{[Equation 4]}$$

In Equation 1 to Equation 4, ‘C’ is one of calcium Ca, strontium Sr, and barium Ba, ‘D’ is one of nickel Ni, manganese Mn, magnesium Mg, and cobalt Co, ‘E’ is niobium Nb or tantalum Ta, and in Equation 1 to Equation 4, ‘a+b+c+d’ is equal to 1, and the ratio of ‘a+b’ and ‘c+d’ is 1.0:1.7 to 1.0:3.0.

Specific details of other embodiments are included in the detailed description and drawings.

According to the embodiments of the present disclosure, the vibration apparatus having the improved piezoelectric characteristics is configured so that it is possible to provide the apparatus or vehicular apparatus with the improved sound characteristics and/or sound pressure characteristics.

According to the embodiments of the present disclosure, the vibration apparatus having the improved piezoelectric characteristics is configured so that it is possible to output the sound with the improved sound characteristics and/or sound pressure characteristics to the front of the vibration member (exterior and/or interior material).

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further embodiments and advantages are discussed below in conjunction with embodiments of the disclosure.

It is to be understood that both the foregoing description and the following description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this disclosure, illustrate embodiments and embodiments of the disclosure and together with the description serve to explain principles of the disclosure.

DETAILED DESCRIPTION OF THE EMBODIMENTS

Figure 1:
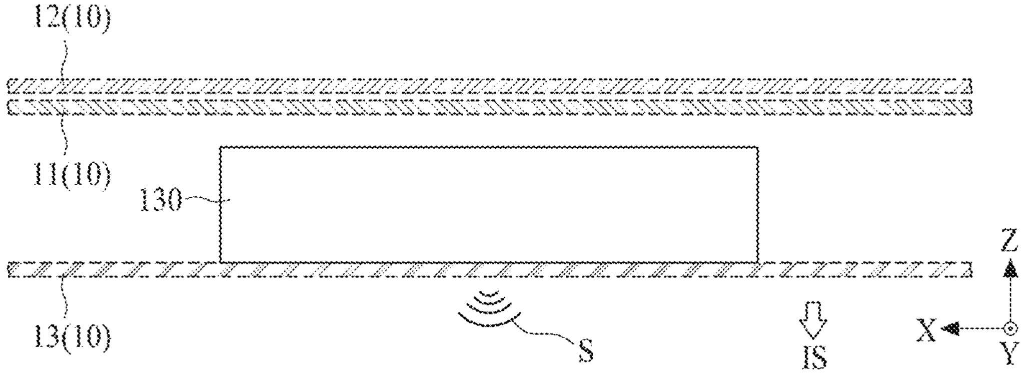
FIG. 1 is a diagram illustrating an apparatus according to an embodiment of the present disclosure.

Reference is now made in detail to embodiments of the present disclosure, examples of which can be illustrated in the accompanying drawings. In the following description, when a detailed description of well-known methods, functions, structures or configurations can unnecessarily obscure embodiments of the present disclosure, a detailed description of such known functions or configurations can have been omitted for brevity. Further, repetitive descriptions can be omitted for brevity. The progression of processing steps and/or operations described is a non-limiting example.

Advantages and features of the present disclosure, and implementation methods thereof, are clarified through the embodiments described with reference to the accompanying drawings. The present disclosure may, however, be embodied in different forms and should not be construed as limited to the example embodiments set forth herein. Rather, these example embodiments are examples and are provided so that this disclosure can be thorough and complete to assist those skilled in the art to understand the inventive concepts without limiting the protected scope of the present disclosure.

Shapes, dimensions (e.g., sizes, lengths, widths, heights, thicknesses, locations, radii, diameters, and areas), proportions, ratios, angles, numbers, the number of elements, and the like disclosed herein, including those illustrated in the drawings, are merely examples, and thus, the present disclosure is not limited to the illustrated details. It is, however, noted that the relative dimensions of the components illustrated in the drawings are part of the present disclosure.

Where a term like "have," "include," "contain," "constitute," "made of," "formed of," "composed of," or the like is used with respect to one or more elements (e.g., layers, films, regions, components, sections, members, parts, regions, areas, portions, steps, operations, and/or the like), one or more other elements can be added unless a term such as "only" or the like is used. The terms used in the present disclosure are merely used in order to describe example embodiments, and are not intended to limit the scope of the present disclosure. The terms of a singular form can include plural forms unless the context clearly indicates otherwise.

The word "exemplary" is used to mean serving as an example or illustration, unless otherwise specified. Embodiments are example embodiments. Embodiments are example embodiments. In one or more implementations, "embodiments," "embodiments," "examples," and the like should not be construed to be preferred or advantageous over other implementations. An embodiment, an example, an example embodiment, or the like can refer to one or more embodiments, one or more examples, one or more example embodiments, or the like, unless stated otherwise. Further, the term "can" encompasses all the meanings of the term "may."

In one or more embodiments, unless explicitly stated otherwise, an element, feature, or corresponding information (e.g., a level, range, dimension, size, or the like) is construed to include an error or tolerance range even where no explicit description of such an error or tolerance range is provided. An error or tolerance range can be caused by various factors (e.g., process factors, internal or external impact, noise, or the like). In interpreting a numerical value, the value is interpreted as including an error range unless explicitly stated otherwise.

In describing a positional relationship, when the positional relationship between two parts (e.g., layers, films, regions, components, sections, or the like) is described, for example, using "on," "upon," "on top of," "over," "under," "above," "below," "beneath," "near," "close to," "adjacent to," "beside," "next to," "at or on a side of," or the like, one or more other parts can be located between the two parts unless a more limiting term, such as "immediate(ly)," "direct(ly)," or "close(ly)," is used.

In describing a temporal relationship, when the temporal order is described as, for example, "after," "subsequent," "next," "before," "preceding," "prior to," or the like, a case that is not consecutive or not sequential can be included and thus one or more other events can occur therebetween, unless a more limiting term, such as "just," "immediate(ly)," or "direct(ly)," is used.

It is understood that, although the terms "first," "second," or the like can be used herein to describe various elements (e.g., layers, films, regions, components, sections, members, parts, regions, areas, portions, steps, operations, and/or the like), these elements should not be limited by these terms, for example, to any particular order, precedence, or number of elements. These terms are used only to distinguish one element from another. For example, a first element can denote a second element, and, similarly, a second element can denote a first element, without departing from the scope of the present disclosure. Furthermore, the first element, the second element, and the like can be arbitrarily named according to the convenience of those skilled in the art without departing from the scope of the present disclosure. For clarity, the functions or structures of these elements (e.g., the first element, the second element and the like) are not limited by ordinal numbers or the names in front of the elements. Further, a first element can include one or more first elements. Similarly, a second element or the like can include one or more second elements or the like.

In describing elements of the present disclosure, the terms "first," "second," "A," "B," "(a)," "(b)," or the like can be used. These terms are intended to identify the corresponding element(s) from the other element(s), and these are not used to define the essence, basis, sequence, order, or number of the elements.

For the expression that an element (e.g., layer, film, region, component, section, or the like) is described as "connected," "coupled," "attached," "adhered," or the like to another element, the element can not only be directly connected, coupled, attached, adhered, or the like to another element, but also be indirectly connected, coupled, attached, adhered, or the like to another element with one or more intervening elements disposed or interposed between the elements, unless otherwise specified.

The term "at least one" should be understood as including any and all combinations of one or more of the associated listed items. For example, each of the phrases "at least one of a first item, a second item, or a third item" and "at least one of a first item, a second item, and a third item", can represent (i) a combination of items provided by one or more of the first item, the second item, and the third item or (ii) only one of the first item, the second item, and the third item.

Features of various embodiments of the present disclosure can be partially or entirely coupled to or combined with each other, can be technically associated with each other, and can be operated, linked, or driven together in various ways. Embodiments of the present disclosure can be implemented or carried out independently from each other, or can be implemented or carried out together in a co-dependent or related relationship. In one or more embodiments, the components of each apparatus according to various embodiments of the present disclosure can be operatively coupled and configured.

In this disclosure, "display apparatus" can include a display device such as a liquid crystal module (LCM) including a display panel and a driver for driving the display panel, and an organic light emitting module (OLED module). And the display apparatus can include a laptop computer, television, computer monitor, vehicle or automotive apparatus, or other type of vehicle, which is a complete product or final product including LCM, OLED module, etc. It can also include a set electronic apparatus or set apparatus, such as an equipment apparatus, a mobile electronic apparatus such as a smartphone or an electronic pad.

Therefore, the display apparatus in this disclosure can include the display device itself, such as an LCM, an OLED module, etc., and an application product including the LCM, an OLED module, etc., or a set device that is a device for end consumers.

In some examples, the LCM and OLED modules, which are composed of a display panel and a driving unit, are expressed as "display apparatus," and electronic devices as finished products, including LCM and OLED modules, can also be expressed separately as "set devices." For example, a display device can include a liquid crystal display (LCD) or organic light emitting diode (OLED) display panel, and a source PCB that is a control unit for driving the display panel. The set device can further include a set PCB, which is a set control unit that is electrically connected to the source PCB and drives the entire set device.

The display panel used in this embodiment can be any type of display panel, such as a liquid crystal display panel, an organic light emitting diode (OLED) display panel, and an electroluminescent display panel, but the embodiments of the present disclosure are not limited thereto. For example, the display panel can be a display panel that can generate sound by being vibrated by a vibration device according to an embodiment of the present disclosure. The display panel applied to the display device according to the embodiment of the present disclosure is not limited to the shape or size of the display panel.

For example, when the display panel is a liquid crystal display panel, it can include a plurality of gate lines, data lines, and pixels formed in intersection areas of the gate lines and data lines. And, an array substrate including a thin film transistor, which is a switching element for controlling the light transmittance in each pixel, an upper substrate including a color filter and/or a black matrix, and a liquid crystal layer formed between the array substrate and the upper substrate. It can be configured to include.

When the display panel is an organic light emitting diode (OLED) display panel, it can include a plurality of gate lines, data lines, and pixels formed in intersection areas of the gate lines and data lines. And, an array substrate including a thin film transistor, which is a device for selectively applying voltage to each pixel, an organic light emitting diode (OLED) layer on the array substrate, and an encapsulation substrate disposed on the array substrate to cover the organic light emitting device layer. The encapsulation substrate protects the thin film transistor and the light emitting device layer from external shock and can prevent moisture or oxygen from penetrating into the light emitting device layer.

Additionally, the layer formed on the array substrate can include an inorganic light emitting layer, for example, a nano-sized material layer, and a quantum dot light emitting layer. Another embodiment of the present disclosure can include a micro light emitting diode.

The display panel can further include a backing, such as a metal plate, attached to the display panel. Other structures can also be included, for example, other structures made of other materials.

Each feature of one or more embodiments of the present disclosure can be partially or fully combined with each other, and various technological interconnections and implementations are possible. Each embodiment can be implemented independently, related to each other, or together.

In addition, for convenience of description, a scale, dimension, size, and thickness of each of the elements illustrated in the accompanying drawings can be different from an actual scale, dimension, size, and thickness, and thus, embodiments of the present disclosure are not limited to a scale, dimension, size, and thickness illustrated in the drawings.

FIG. 1 is a diagram illustrating an apparatus according to an embodiment of the present disclosure.

Referring to FIG. 1, the apparatus according to the embodiment of the present disclosure can include a vibration apparatus 130. The vibration apparatus 130 can be disposed or equipped at a vehicle 10 to output a sound S toward an interior space (or an indoor space) IS of the vehicle (or a vehicular apparatus) 10.

The vehicle (or the vehicular apparatus) 10 can be a vehicular apparatus which includes one or more seats and/or one or more glass windows (or windows). For example, the vehicle (or the vehicular apparatus) 10 can include a wheeled vehicle, a train, a ship, or an aircraft, but embodiments of the present disclosure are not limited thereto.

The vehicle (or the vehicular apparatus) 10 according to an embodiment of the present disclosure can include a main structure 11.

The main structure 11 of the vehicle 10 can include a main frame, a sub-frame, a side frame, a door frame, an underframe, and a seat frame, or the like, but embodiments of the present disclosure are not limited thereto. For example, the main structure 11 can be a vehicle body, a vehicle structure, or a frame structure, or the like, but embodiments of the present disclosure are not limited thereto.

The vehicle (or the vehicular apparatus) 10 according to an embodiment of the present disclosure can further include an exterior material 12.

The exterior material 12 of the vehicle 10 can be configured to cover an outer portion of the main structure 11. In the following description, the exterior material 12 can be a vehicle exterior material 12, and can be used interchangeably.

The exterior material (or vehicle exterior material) 12 of the vehicle 10 can include a hood panel, a front fender panel, a dash panel, a pillar panel, a trunk panel, a roof panel (or ceiling), a floor panel, a door inner panel, and a door outer panel, or the like, but embodiments of the present disclosure are not limited thereto.

The exterior material 12 according to an embodiment of the present disclosure can include at least one of a planar portion (or a flat portion) and a curved portion (or a flexural portion or an uneven portion). For example, the exterior material 12 can have a structure corresponding to a structure of a corresponding main structure 11, or can have a structure which differs from a structure of a corresponding main structure 11.

The vehicle (or the vehicular apparatus) 10 according to an embodiment of the present disclosure can further include a vehicle interior material 13. In the following description, the vehicle interior material 13 can be an interior material 13, and can be used interchangeably.

The vehicle interior material 13 can include all elements (or components) configuring an inner portion of the vehicle 10, or can include all elements (or components) disposed at the interior space IS of the vehicle 10. For example, the vehicle interior material 13 can be an interior member or an interior finish material of the vehicle 10, but embodiments of the present disclosure are not limited thereto.

The vehicle interior material 13 according to an embodiment of the present disclosure can be configured to cover one or more of main structure 11 and the exterior material 12 in the interior space (or an inner portion) IS of the vehicle 10. For example, the vehicle interior material 13 can cover one or more of main structure 11 and the exterior material 12 in the interior space IS of the vehicle 10 and can be configured to be exposed at the interior space IS of the vehicle 10.

The vehicle interior material 13 according to an embodiment of the present disclosure can be configured to be exposed at the inner portion and/or the interior space IS of the vehicle 10 in the inner portion and/or the interior space IS of the vehicle 10. For example, the vehicle interior material 13 can be configured to cover one or more surfaces (or an interior surface) of at least one of a main frame (or a vehicle body), a side frame (or a side body), a door frame (or a door body), a steering wheel frame (or a steering hub), and a seat frame, which are exposed at the interior space IS of the vehicle 10.

The vehicle interior material 13 according to an embodiment of the present disclosure can include a dashboard, a pillar interior material (or a pillar trim), a floor interior material (or a floor carpet), a roof interior material (or a headliner), a door interior material (or a door trim), a steering wheel interior material (or a steering cover), a seat interior material, a rear package interior material (or a back seat shelf), an overhead console (or an illumination interior material), a rear view mirror, a glove box, and a sun visor, or the like, but embodiments of the present disclosure are not limited thereto.

The vehicle interior material 13 according to an embodiment of the present disclosure can include one or more materials of metal, wood, rubber, plastic, glass, fiber, cloth, paper, a mirror, leather, and carbon, but embodiments of the present disclosure are not limited thereto. The vehicle interior material 13 including a plastic material can be an injection material which is implemented by an injection process using a thermoplastic resin or a thermosetting resin, but embodiments of the present disclosure are not limited thereto. The vehicle interior material 13 including a fiber material can include at least one of a plastic composite fiber, a carbon fiber (or an aramid fiber), and a natural fiber, but embodiments of the present disclosure are not limited thereto. The vehicle interior material 13 including the fiber material can include a textile sheet, a knit sheet, or a nonwoven fabric, or the like, but embodiments of the present disclosure are not limited thereto. For example, the paper can be cone paper for speakers. For example, the cone paper can be pulp or foamed plastic, or the like, but embodiments of the present disclosure are not limited thereto. The vehicle interior material 13 including a leather material can include natural leather or artificial leather, but embodiments of the present disclosure are not limited thereto.

The vehicle interior material 13 according to an embodiment of the present disclosure can include at least one of a planar portion (or a flat portion) and a curved portion (or a flexural portion or an uneven portion). For example, the vehicle interior material 13 can have a structure corresponding to a structure (or an inner surface structure) of a corresponding main structure 11, or can have a structure which differs from a structure of a corresponding main structure 11.

According to an embodiment of the present disclosure, the vibration apparatus 130 can be disposed at the vehicle interior material 13. The vibration apparatus 130 can vibrate the vehicle interior material 13 to generate a sound S based on a vibration of the vehicle interior material 13. For example, the vibration apparatus 130 can directly vibrate the vehicle interior material 13 to generate the sound S based on a vibration of the vehicle interior material 13. For example, the vibration apparatus 130 can be configured to vibrate the vehicle interior material 13 to output the sound S toward the inner portion or the interior space IS of the vehicle 10. Thus, the vibration apparatus 130 can use the vehicle interior material 13 as a sound vibration plate, a sound diaphragm, or an acoustic diaphragm. The vehicle interior material 13 can be a vibration plate, a sound vibration plate, or a sound generating plate for outputting the sound S. For example, the vehicle interior material 13 can have a size which is greater than the vibration apparatus 130, but embodiments of the present disclosure are not limited thereto.

For example, the vibration apparatus 130 can be disposed at at least one of a dashboard, a pillar interior material, a floor interior material, a roof interior material, a door interior material, a steering wheel interior material, and a seat interior material, or can be connected (or coupled) to at least one of a rear package interior material, an overhead console, a rear view mirror, a glove box, and a sun visor.

The vehicle 10 according to an embodiment of the present disclosure can include at least one vibration apparatuses. The vibration apparatus 130 for vehicles can vibrate a corresponding vehicle interior material 13 by at least one of at least one vibration apparatuses 130 disposed at the vehicle interior material 13 to output a realistic sound S and/or stereo sound including a multichannel toward the interior space IS of the vehicle 10.

According to an embodiment of the present disclosure, the vibration apparatus 130 can be configured at a region between the vehicle interior material 13 and the main structure 11, or a region between the vehicle interior material 13 and the exterior material 12. The vibration apparatus 130 can be disposed at a region between the vehicle interior material 13 and the main structure 11, or a region between the vehicle interior material 13 and the exterior material 12, and can indirectly or directly vibrate one or more of the region between the vehicle interior material 13 and the main structure 11 and the region between the vehicle interior material 13 and the exterior material 12 to output sound.

According to an embodiment of the present disclosure, the vibration apparatus 130 can be disposed at one or more of a region between the main structure 11 and the exterior material 12, a region between the main structure 11 and the vehicle interior material 13, the exterior material 12, and the vehicle interior material 13. For example, the vibration apparatus 130 can be disposed at one or more of a region between the main structure 11 and the exterior material 12, a region between the main structure 11 and the vehicle interior material 13, the exterior material 12, and the vehicle interior material 13, and can be configured to output a sound. For example, the vibration apparatus 130 can be disposed at one or more of a region between the main structure 11 and the exterior material 12, a region between the main structure 11 and the vehicle interior material 13, the exterior material 12, and the vehicle interior material 13, and can indirectly or directly vibrate one or more of a region between the main structure 11 and the exterior material 12, a region between the main structure 11 and the vehicle interior material 13, the exterior material 12, and the vehicle interior material 13 to output sound. For example, the vibration apparatus 130 can be disposed at the region between the exterior material 12 and the vehicle interior material 13, and can indirectly or directly vibrate one or more of the exterior material 12 and the vehicle interior material 13 to output sound. For example, the vibration apparatus 130 can be disposed at least one of the exterior material 12, the vehicle interior material 13, and a region between the exterior material 12 and the vehicle interior material 13. According to an embodiment of the present disclosure, the at least one of the exterior material 12, the vehicle interior material 13, and a region between the exterior material 12 and vehicle the interior material 13 can output a sound based on a vibration of the vibration apparatus 130.

The vibration apparatus 130 according to an embodiment of the present disclosure can output a sound in a region between the exterior material 12 and the vehicle interior material 13 of the vehicle 10. For example, the vibration apparatuses 130 can be connected or coupled to one or more of the exterior material 12 and the vehicle interior material 13 in a region between the exterior material 12 and the vehicle interior material 13, and can indirectly or directly vibrate one or more of the exterior material 12 and the vehicle interior material 13 to output sound.

One or more of the exterior material 12 and the vehicle interior material 13 of the vehicle 10 can be a vibration plate, a sound vibration plate, a sound generating plate, or the like configured to output a sound. For example, each of the exterior material 12 and the vehicle interior material 13 configured to output the sound can have a size which is greater than that of the vibration apparatus 130, and thus, can perform a function of a large-area vibration plate, a large-area sound vibration plate, or a large-area sound generating plate, thereby enhancing sound characteristics and/or sound pressure level characteristics of a sound band including a low-pitched sound band generated by the vibration apparatus 130. For example, a frequency of a sound of the low-pitched sound band can be 300 Hz or less, 400 Hz or less, or 500 Hz or less, but embodiments of the present disclosure are not limited thereto.

Figure 2:
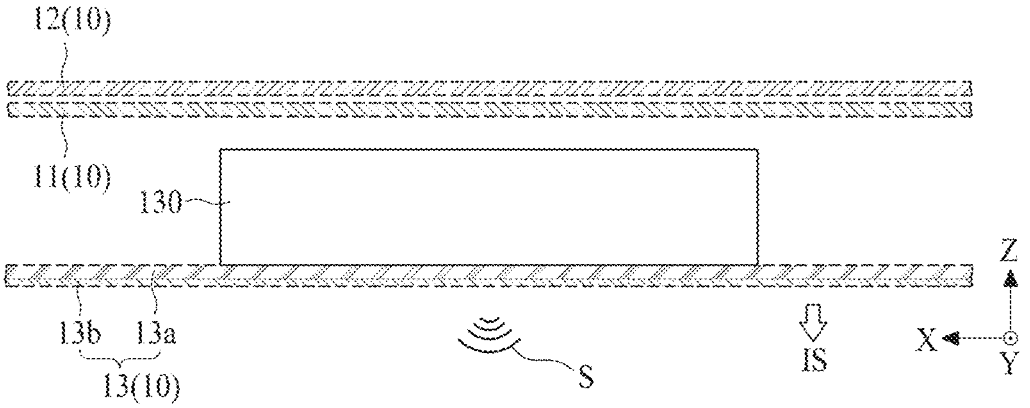
FIG. 2 is a diagram illustrating an apparatus according to an embodiment of the present disclosure.

FIG. 2 is a diagram illustrating an apparatus according to an embodiment of the present disclosure. Particularly, FIG. 2 illustrates an embodiment implemented by modifying the vehicle interior material on which the vibration apparatus described above with reference to FIG. 1 is disposed. Therefore, in the following description, repetitive descriptions of elements other than a vehicle interior material are omitted or will be briefly given.

Referring to FIG. 2, the vibration apparatus 130 according to another embodiment of the present disclosure can vibrate a vehicle interior material 13 including one or more materials of metal, wood, rubber, plastic, carbon, glass, fiber, cloth, paper, a mirror, and leather to output a sound S. But embodiments of the present disclosure are not limited thereto.

The vehicle interior material 13 according to another embodiment of the present disclosure can include a base member 13*a* and an outer member (or a surface member) 13*b*. For example, the base member 13*a* can be an injection material, a first interior material, an inner interior material, or a rear interior material, but embodiments of the present disclosure are not limited thereto. The outer member 13*b* can be a second interior material, an outer interior material, a front interior material, an outer surface member, a reinforcement member, or a decoration member, but embodiments of the present disclosure are not limited thereto.

The base member 13*a* can include a plastic material. The base member 13*a* according to an embodiment of the present disclosure can include an injection material. For example, the base member 13*a* can be an injection material which is implemented by an injection process using a thermoplastic resin or a thermosetting resin, but embodiments of the present disclosure are not limited thereto. The vehicle interior material 13 or the base member 13*a* can be configured to cover an inner portion of a vehicle 10. For example, the vehicle interior material 13 or the base member 13*a* can be configured to cover one or more of the main structure 11 and the exterior material 12 in an interior space IS of the vehicle 10. For example, the vehicle interior material 13 or the base member 13*a* can be configured to cover one surface (or an inner surface) of at least one of a main frame, a side frame, a door frame, and a steering wheel frame, which are exposed at the interior space IS of the vehicle 10.

The base member 13*a* can include at least one of a planar portion and a curved portion. For example, the base member 13*a* can have a structure corresponding to a structure (or a rear structure) of a corresponding main structure 11, or can have a structure which differs from a structure of a corresponding main structure 11.

The outer member 13*b* can be disposed on the base member 13*a*. For example, the outer member 13*b* can be disposed to cover the base member 13*a*. The outer member 13*b* can cover the base member 13*a* at the inner portion or the interior space IS of the vehicle 10 and can be configured to be exposed at the inner portion or the interior space IS of the vehicle 10. For example, the outer member 13*b* can be disposed at or coupled to a front surface (or an interior surface) of the base member 13*a* exposed at the interior space IS of the vehicle 10.

The vehicle interior material 13 according to an embodiment of the present disclosure can include any one or more materials of plastic, glass, fiber, leather, cloth, rubber, a mirror, wood, paper, carbon, and metal, but embodiments of the present disclosure are not limited thereto. For example, the outer member 13*b* can be a fiber material. For example, the outer member 13*b* including the fiber material can include at least one of a synthetic fiber, a carbon fiber (or an aramid fiber), and a natural fiber, but embodiments of the present disclosure are not limited thereto. For example, the outer member 13*b* including the fiber material can be a textile sheet, a knit sheet, or a nonwoven fabric, but embodiments of the present disclosure are not limited thereto. For example, the outer member 13*b* including the fiber material can be a fabric member, but embodiments of the present disclosure are not limited thereto.

For example, a skin member 13*b* of a fiber material can include at least one of synthetic fiber, carbon fiber (or aramid fiber), and natural fiber, but embodiments of the present disclosure are not limited thereto. The synthetic fiber can be a thermoplastic resin and can include a polyolefin-based fiber which is an eco-friendly material which does not relatively release a harmful substance. For example, the polyolefin-based fiber can include a polyethylene fiber, a polypropylene fiber, or a polyethylene terephthalate fiber, but embodiments of the present disclosure are not limited thereto. The polyolefin-based fiber can be a fiber of a single resin or a fiber of a core-shell structure, but embodiments of the present disclosure are not limited thereto. The natural fiber can be a composite fiber of one or two or more of a jute fiber, a kenaf fiber, an abaca fiber, a coconut fiber, and a wood fiber, but embodiments of the present disclosure are not limited thereto.

The vibration apparatus 130 can be covered by the vehicle interior material 13. The vibration apparatus 130 can be configured to vibrate the vehicle interior material 13 including the base member 13*a* and the outer member 13*b* to output a sound S toward the inner portion and/or the interior space IS of the vehicle 10.

The vibration apparatus 130 according to another embodiment of the present disclosure can output the sound S toward the interior space IS of the vehicle 10 using the vehicle interior material 13 as a vibration plate or a sound vibration plate and can output a realistic sound S or stereo sound including a multichannel toward the interior space IS of the vehicle 10.

According to another embodiment of the present disclosure, the vibration apparatus 130 can be configured to be surrounded by an enclosure. A space can be provided between the vibration apparatus 130 and the enclosure, and a sound (or a sound pressure level) can be output based on a vibration of the vehicle interior material 13 based on air between the sound apparatus and the enclosure.

According to an embodiment of the present disclosure, a vehicular interior material 13 can be a vibration member. The vibration member can generate vibration or can output sound (or sound wave) according to displacement (or driving) of a vibration apparatus 130. The vibration member can be a vibration object, a signage panel, a passive vibration plate, a front surface member, a vibration panel, a display panel, a sound plate, a sound panel, a passive vibration panel, an acoustic output plate, or an acoustic vibration plate, but embodiments of the present disclosure are not limited thereto.

For example, when the vibration member is a display panel, the display panel can display an image, for example, an electronic image or a digital image. For example, the display panel can display an image by outputting light. The display panel can be any type of display panel or curved display panel such as a liquid crystal display panel, an organic light emitting display panel, a quantum dot light emitting display panel, a micro light emitting diode display panel, and an electrophoretic display panel. The display panel can be a flexible display panel. For example, the display panel can be a flexible light emitting display panel, a flexible electrophoretic display panel, a flexible electrowetting display panel, a flexible micro light emitting diode display panel, or a flexible quantum dot light emitting display panel, but embodiments of the present disclosure are not limited thereto.

The vibration apparatus 130 can be disposed on a rear surface (or back surface) of the display panel (or vibration member). For example, the vibration apparatus 130 can vibrate the display panel (or vibration member) on the rear surface of the display panel (or vibration member), whereby the vibration apparatus 130 can provide sound and/or haptic feedback based on the vibration of the display panel (or vibration member) to a user. The vibration apparatus 130 can be implemented on the rear surface of the display panel (or vibration member) to directly vibrate the display panel (or vibration member). For example, the vibration apparatus 130 can be a vibration generating apparatus, a displacement apparatus, a sound apparatus, or a sound generating apparatus, but not limited thereto.

As an embodiment of the present disclosure, the vibration apparatus 130 can vibrate according to a vibration driving signal synchronized with an image displayed on the display panel, to thereby vibrate the display panel. According to another embodiment of the present disclosure, the vibration apparatus 130 can be disposed on the display panel and can vibrate according to a haptic feedback signal (or tactile feedback signal) synchronized with a user touch on a touch panel (or touch sensor layer) embedded in the display panel, to thereby vibrate the display panel. Accordingly, the display panel can vibrate according to the vibration of the vibration apparatus 130 and can provide at least one of sound and haptic feedback to a user (or viewer).

The vibration apparatus 130 according to the embodiment of the present disclosure can be implemented in the form of film. Since the vibration apparatus 130 is implemented in the form of film, it can have a thickness smaller than that of the display panel so that it is possible to minimize the increase of thickness in the display apparatus caused by the arrangement of the vibration apparatus 130. For example, the vibration apparatus 130 can be a sound generating module using a display panel as a sound vibration plate, a sound generating apparatus, a vibration generating apparatus, a displacement apparatus, a sound apparatus, a film actuator, a film type piezoelectric composite actuator, a film speaker, a film type piezoelectric speaker, or a film type piezoelectric composite speaker, but embodiments of the present disclosure are not limited thereto.

In another embodiment of the present disclosure, the vibration apparatus 130 can be applied to a non-display panel rather than the display panel. For example, the non-display panel can be one or more of metal, plastic, fiber, leather, wood, cloth, rubber, carbon, glass, paper, an interior material of vehicular means, a ceiling material of vehicular means, an exterior material of vehicular means, an indoor ceiling of building, and an interior material of aircraft, but embodiments of the present disclosure are not limited thereto. In this case, the non-display panel can be applied as a vibration plate, and the vibration apparatus 130 can output sound by vibrating the non-display panel.

For example, the vibration member according to the embodiment of the present disclosure can include a display panel having a pixel for displaying an image or can include a non-display panel. For example, the vibration member can include a display panel having a pixel for displaying an image or can be one or more of metal, plastic, fiber, leather, wood, cloth, rubber, carbon, glass, paper, an interior material of vehicular means, a ceiling material of vehicular means, an exterior material of vehicular means, a window of vehicular means, an interior ceiling of building, a window of building, an interior material of building, an interior material of aircraft, and a glass window of aircraft, but embodiments of the present disclosure are not limited thereto. For example, the paper can be a cone paper for a speaker. For example, the cone paper can be pulp or foamed plastic, or the like, but embodiments of the present disclosure are not so limited. For example, the vibration member can include one or more of a display panel having a pixel for displaying an image, a screen panel on which an image is projected from a display apparatus, a lighting panel, a signage panel, an interior material of vehicular means, a ceiling material of vehicular means, a window of vehicular means, an exterior material of vehicular means, a ceiling material of building, an interior material of building, a window of building, an interior material of aircraft, a window of aircraft, and a mirror, but embodiments of the present disclosure are not limited thereto. For example, the vehicular means can include a vehicle, an aircraft, or a train, but embodiments of the present disclosure are not limited thereto. For example, the non-display panel can be a light emitting diode lighting panel (or apparatus), an organic light emitting lighting panel (or apparatus), or an inorganic light emitting lighting panel (or apparatus), but embodiments of the present disclosure are not limited thereto. For example, the vibration member can include a display panel having a pixel for displaying an image or can be one or more of a light emitting diode lighting panel (or apparatus), an organic light emitting lighting panel (or apparatus), or an inorganic light emitting lighting panel (or apparatus), but embodiments of the present disclosure are not limited thereto.

Figure 3:
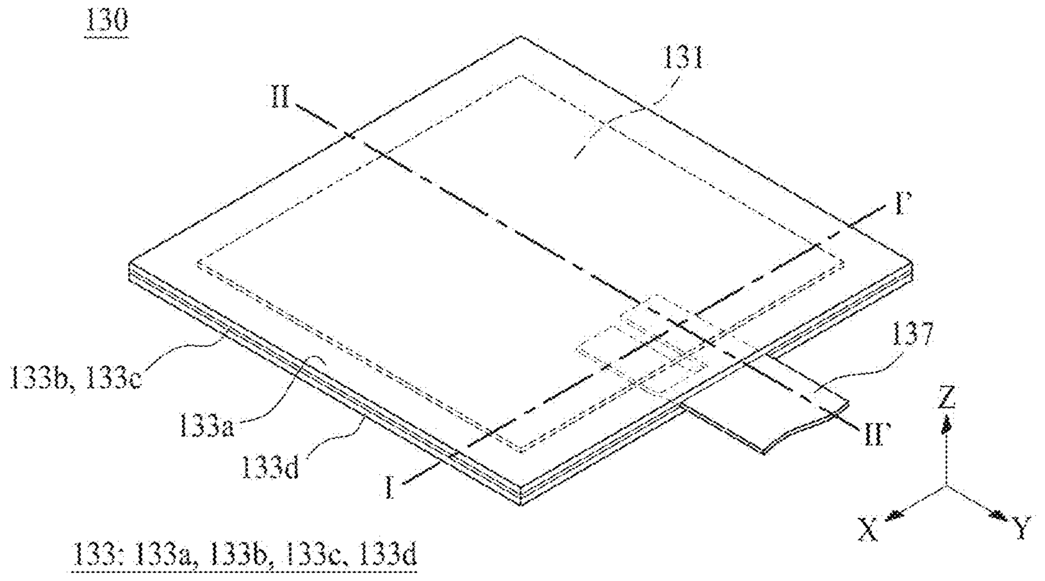
FIG. 3 is a diagram illustrating a vibration apparatus according to an embodiment of the present disclosure.
Figure 4:
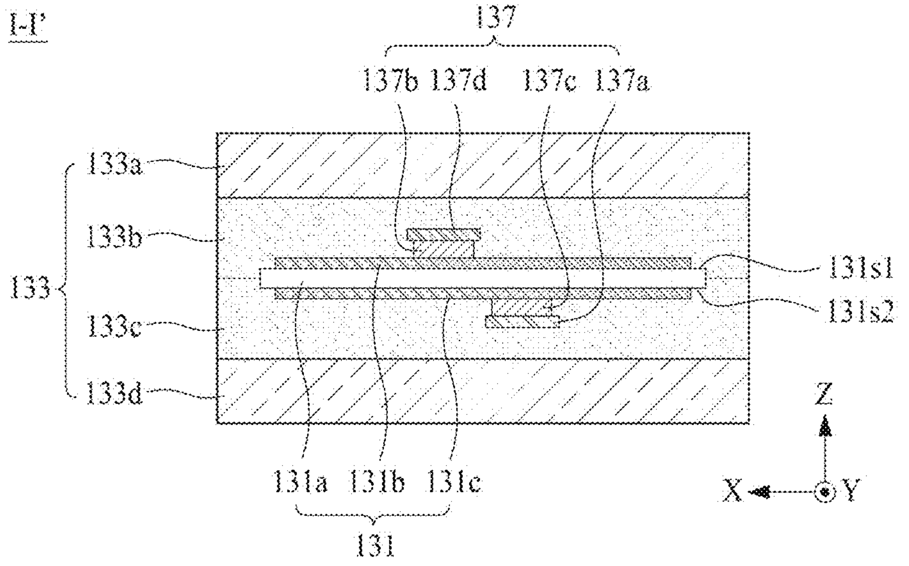
FIG. 4 is a cross-sectional view taken along line I-I' of FIG. 3 according to an embodiment of the present disclosure.
Figure 5:
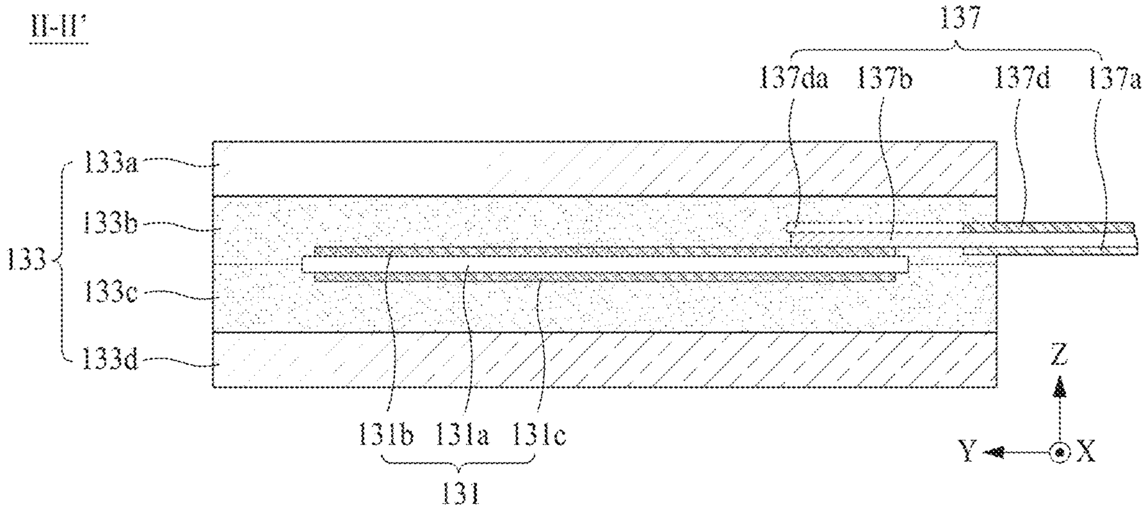
FIG. 5 is a cross-sectional view taken along line II-II' of FIG. 3 according to an embodiment of the present disclosure.
Figure 6:
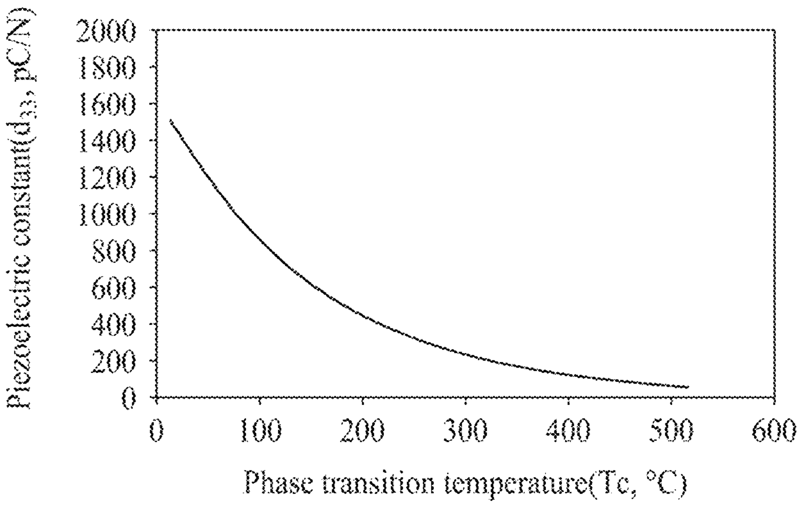
FIG. 6 is a diagram illustrating a phase transition temperature and a piezoelectric constant of a vibration element according to an experimental example of the present disclosure.

FIG. 3 is a diagram illustrating a vibration apparatus according to an embodiment of the present disclosure. FIG. 4 is a cross-sectional view taken along line I-I' of FIG. 3 according to an embodiment of the present disclosure. FIG. 5 is a cross-sectional view taken along line II-II' of FIG. 3 according to an embodiment of the present disclosure. FIG. 6 is a diagram illustrating a phase transition temperature and a piezoelectric constant of a vibration element according to an experimental example of the present disclosure.

Referring to FIGS. 3 to 5, the vibration apparatus 130 according to an embodiment of the present disclosure can include a piezoelectric material having a piezoelectric characteristic. The vibration apparatus 130 can be configured as a ceramic-based piezoelectric material for implementing a relatively strong vibration, or can be configured as a piezoelectric ceramic having a perovskite-based crystal structure, but the present disclosure is not limited thereto.

The vibration apparatus 130 according to an embodiment of the present disclosure can include a vibration part 131.

The vibration part 131 can be configured to vibrate by a piezoelectric effect based on a driving signal. The vibration part 131 can include at least one of a piezoelectric inorganic material and a piezoelectric organic material. For example, the vibration part 131 can be a vibration device, a piezoelectric device, a piezoelectric device part, a piezoelectric device layer, a piezoelectric structure, a piezoelectric vibration part, or a piezoelectric vibration layer, or the like, but embodiments of the present disclosure are not limited thereto.

The vibration part 131 according to an embodiment of the present disclosure can include a vibration layer 131*a*, a first electrode layer 131*b*, and a second electrode layer 131*c*.

The vibration layer 131*a* can include a piezoelectric material or an electroactive material which includes a piezoelectric effect. For example, the piezoelectric material can have a characteristic in which, when pressure or twisting phenomenon is applied to a crystalline structure by an external force, a potential difference occurs due to dielectric polarization caused by a relative position change of a positive (+) ion and a negative (−) ion, and a vibration is generated by an electric field based on a reverse voltage applied thereto. For example, the vibration layer 131*a* can be a piezoelectric layer, a piezoelectric material layer, an electroactive layer, a piezoelectric composite layer, a piezoelectric composite, or a piezoelectric ceramic composite, or the like, but embodiments of the present disclosure are not limited thereto.

The vibration layer 131*a* can be configured as a ceramic-based material for implementing a relatively strong vibration, or can be configured as a piezoelectric ceramic having a perovskite-based crystalline structure. The perovskite crystalline structure can have a piezoelectric effect and/or an inverse piezoelectric effect and can be a plate-shaped structure having orientation.

The first electrode layer 131*b* can be disposed at a first surface (or an upper surface or a front surface) 131*s*1 of the vibration layer 131*a*. The first electrode layer 131*b* can have a same size as that of the vibration layer 131*a*, or can have a size which is smaller than that of the vibration layer 131*a*.

The second electrode layer 131*c* can be disposed at a second surface (or a lower surface or a rear surface) 131*s*2 which is opposite to or different from the first surface 131*s*1 of the vibration layer 131*a*. The second electrode layer 131*c* can have a same size as that of the vibration layer 131*a*, or can have a size which is smaller than that of the vibration layer 131*a*. For example, the second electrode layer 131*c* can have a same shape as that of the vibration layer 131*a*, but embodiments of the present disclosure are not limited thereto.

According to an embodiment of the present disclosure, in order to prevent electrical short circuit between the first electrode layer 131*b* and the second electrode layer 131*c*, each of the first electrode layer 131*b* and the second electrode layer 131*c* can be formed at the other portion, except a periphery portion, of the vibration layer 131*a*. For example, the first electrode layer 131*b* can be formed at an entire first surface 131*s*1, other than a periphery portion, of the vibration layer 131*a*. For example, the second electrode layer 131*c* can be formed at an entire second surface 131*s*2, other than a periphery portion, of the vibration layer 131*a*. For example, a distance between a lateral surface (or a sidewall) of each of the first electrode layer 131*b* and the second electrode layer 131*c* and a lateral surface (or a sidewall) of the vibration layer 131*a* can be at least 0.5 mm or more. For example, the distance between the lateral surface of each of the first electrode layer 131*b* and the second electrode layer 131*c* and the lateral surface of the vibration layer 131*a* can be at least 1 mm or more, but embodiments of the present disclosure are not limited thereto.

According to an embodiment of the present disclosure, one or more of the first electrode layer 131*b* and the second electrode layer 131*c* can be formed of a transparent conductive material, a semitransparent conductive material, or an opaque conductive material. For example, the transparent conductive material or the semitransparent conductive material can include indium tin oxide (ITO) or indium zinc oxide (IZO), but embodiments of the present disclosure are not limited thereto. The opaque conductive material can include gold (Au), silver (Ag), platinum (Pt), palladium (Pd), molybdenum (Mo), magnesium (Mg), carbon, or silver (Ag) including glass frit, or the like, or can be formed of an alloy thereof, but embodiments of the present disclosure are not limited thereto. Additionally, to enhance an electrical characteristic and/or a vibration characteristic of the vibration layer 131*a*, each of the first electrode layer 131*b* and the second electrode layer 131*c* can include silver (Ag) having a low resistivity. Further, carbon can be carbon black, ketjen black, carbon nanotube, and a carbon material including graphite, but embodiments of the present disclosure are not limited thereto.

The vibration layer 131*a* can be polarized (or poling) by a certain voltage applied to the first electrode layer 131*b* and the second electrode layer 131*c* in a certain temperature atmosphere, or a temperature atmosphere that can be changed from a high temperature to a room temperature, but embodiments of the present disclosure are not limited thereto. For example, a polarization direction (or a poling direction) formed in the vibration layer 131*a* can be formed or aligned (or arranged) from the first electrode layer 131*b* to the second electrode layer 131*c*, but is not limited thereto, and a polarization direction (or a poling direction) formed in the vibration layer 131*a* can be formed or aligned (or arranged) from the second electrode layer 131*c* to the first electrode layer 131*b*.

The vibration layer 131*a* can alternately and repeatedly contract and/or expand based on an inverse piezoelectric effect according to a driving signal applied to the first electrode layer 131*b* and the second electrode layer 131*c* from an outside to vibrate. For example, the vibration layer 131*a* can vibrate in a vertical direction (or a thickness direction) and in a planar direction by the driving signal applied to the first electrode layer 131*b* and the second electrode layer 131*c*. The vibration layer 131*a* can be displaced (or vibrated or driven) by contraction and/or expansion of the planar direction, thereby improving sound characteristics and/or sound pressure level characteristics of the vibration apparatus 130.

The vibration apparatus 130 according to an embodiment of the present disclosure can further include a cover member 133.

The cover member 133 can be configured to cover at least one of a first surface and a second surface of the vibration part 131. The cover member 133 can be configured to protect at least one of the first surface and the second surface of the vibration part 131. For example, the first surface of the vibration part 131 can be a front surface, a highest surface, or an upper surface. For example, the second surface of the vibration part 131 can be a rear surface, a back surface, or a lower surface which are opposite to the first surface. In an embodiment of the present disclosure, the cover member 133 can surround the vibration part 131.

The cover member 133 according to an embodiment of the present disclosure can include a first cover member 133*a*.

The first cover member 133*a* can be disposed at the first surface of the vibration part 131. For example, the first cover member 133*a* can be configured to cover the first electrode layer 131*b* of the vibration part 131. For example, the first cover member 133*a* can be configured to have a larger size than the vibration part 131. The first cover member 133*a* can be configured to protect the first surface of the vibration part 131 and the first electrode layer 131*b*.

The first cover member 133*a* according to an embodiment of the present disclosure can include an adhesive layer. For example, the first cover member 133*a* can include a base film, and an adhesive layer which is in the base film and is connected or coupled to the first surface of the vibration part 131. Further, the adhesive layer can include an electrical insulating material which has adhesive properties and is capable of compression and decompression.

The first cover member 133*a* according to another embodiment of the present disclosure can be connected or coupled to the first surface of the vibration part 131 by a first adhesive layer 133*b*. For example, the first cover member 133*a* can be connected or coupled to the first surface or the first electrode layer 131*b* of the vibration part 131 by the first adhesive layer 133*b*. Additionally, the first cover member 133*a* can be connected or coupled to the first surface or the first electrode layer 131*b* of the vibration part 131 by a film laminating process by the first adhesive layer 133*b*. The first adhesive layer 133*b* can be configured to surround an entire first surface and a portion of a side surface (or lateral surface) of the vibration part 131.

The cover member 133 according to an embodiment of the present disclosure can include a second adhesive layer 133*c*.

The second adhesive layer 133*c* can be disposed at the second surface of the vibration part 131. The second adhesive layer 133*c* can be configured to cover the second electrode layer 131*c* of the vibration part 131. The second adhesive layer 133*c* can be configured to protect the second surface and the second electrode layer 131*c* of the vibration part 131. In addition, the second adhesive layer 133*c* can be configured to surround an entire second surface and a portion of a side surface (or lateral surface) of the vibration part 131. For example, the second adhesive layer 133*c* can be a protection layer or a protection member.

The second adhesive layer 133*c* can be connected or coupled to the first adhesive layer 133*b* in a side surface (or lateral surface) of the vibration part 131 or a periphery portion of the first cover member 133*a*. Thus, the first adhesive layer 133*b* and the second adhesive layer 133*c* can be configured to surround or completely surround the vibration part 131. For example, the vibration part 131 can be inserted (or accommodated) or embedded (or built-in) at an inner portion of the adhesive layer including the first adhesive layer 133*b* and the second adhesive layer 133*c*.

The cover member 133 according to an embodiment of the present disclosure can further include a second cover member 133*d*, but embodiments of the present disclosure are not limited thereto.

The second cover member 133*d* can be disposed at the second surface of the vibration part 131. For example, the second cover member 133*d* can be configured to cover the second electrode layer 131*c* of the vibration part 131. For example, the second cover member 133*d* can be configured to have a larger size than the vibration part 131 and can be configured to have a same size as the vibration part 131. The second cover member 133*d* can be configured to protect the second surface and the second electrode layer 131*c* of the vibration part 131.

The first cover member 133*a* and the second cover member 133*d* according to an embodiment of the present disclosure can include a same material or a different material.

The second cover member 133*d* can be connected or coupled to the second surface or the second electrode layer 131*c* of the vibration part 131 by a second adhesive layer 133*c*. Further, the second cover member 133*d* can be connected or coupled to the second surface or the second electrode layer 131*c* of the vibration part 131 by a film laminating process by the second adhesive layer 133*c*.

The vibration part 131 can be disposed or inserted (or accommodated) between the first cover member 133*a* and the second cover member 133*d*. For example, the vibration part 131 can be inserted (or accommodated) or embedded (or built-in) at an inner portion of the adhesive layer including the first adhesive layer 133*b* and the second adhesive layer 133*c*.

Each of the first adhesive layer 133*b* and the second adhesive layer 133*c* according to an embodiment of the present disclosure can include an electrical insulating material which has adhesive properties and is capable of compression and decompression. For example, each of the first adhesive layer 133*b* and the second adhesive layer 133*c* can include epoxy resin, acrylic resin, silicone resin, urethane resin, a pressure sensitive adhesive (PSA), an optically cleared adhesive (OCA), or an optically cleared resin (OCR), or the like, but embodiments of the present disclosure are not limited thereto.

The first adhesive layer 133*b* and the second adhesive layer 133*c* can be configured between the first cover member 133*a* and the second cover member 133*d* to surround the vibration part 131. For example, one or more of the first adhesive layer 133*b* and the second adhesive layer 133*c* can be configured to surround the vibration part 131.

The vibration apparatus 130 according to an embodiment of the present disclosure can further include a signal supply member 137.

The signal supply member 137 can be configured to supply a driving signal supplied from the driving circuit unit to the vibration part 131. The signal supply member 137 can be configured to be electrically connected to the vibration part 131. The signal supply member 137 can be configured to be electrically connected to the first electrode layer 131*b* and the second electrode layer 131*c* of the vibration part 131.

A portion of the signal supply member 137 can be accommodated (or inserted) between the cover member 133 and the vibration part 131. For example, the portion of the signal supply member 137 can be accommodated (or inserted) between the first surface of the vibration part 131 and the first cover member 133*a*. For example, the portion of the signal supply member 137 can be accommodated (or inserted) between the first cover member 133*a* and the second cover member 133*d*.

According to an embodiment of the present disclosure, an end portion (or a distal end portion or one side) of the signal supply member 137 can be disposed or inserted (or accommodated) between one periphery portion of the cover member 133 and the vibration part 131. For example, the end portion (or a distal end portion or one side) of the signal supply member 137 can be disposed or inserted (or accommodated) between one periphery portion of the first cover member 133*a* and the first surface of the vibration part 131.

According to another embodiment of the present disclosure, the end portion (or a distal end portion or one side or one portion) of the signal supply member 137 can be disposed or inserted (or accommodated) between the one periphery portion of the first cover member 133*a* and one periphery portion of the second cover member 133*d*. The one periphery portion of the first cover member 133*a* and the one periphery portion of the second cover member 133*d* can accommodate or vertically (or up and down) cover the end portion (or the distal end portion or the one side) of the signal supply member 137. Accordingly, the signal supply member 137 can be integrated as one body with the vibration apparatus 130. For example, the signal supply member 137 can be configured as a signal cable, a flexible cable, a flexible printed circuit cable, a flexible flat cable, a single-sided flexible printed circuit, a single-sided flexible printed circuit board, a flexible multilayer printed circuit, or a flexible multilayer printed circuit board, but embodiments of the present disclosure are not limited thereto.

The signal supply member 137 according to an embodiment of the present disclosure can include a base member 137*a* and a plurality of signal lines 137*b* and 137*c*. For example, the signal supply member 137 can include a base member 137*a*, a first signal line 137*b*, and a second signal line 137*c*.

The base member 137*a* can include a transparent or opaque plastic material, but embodiments of the present disclosure are not limited thereto. The base member 137*a* can have a certain width along a first direction X and can be extended long along a second direction Y intersecting with the first direction X.

The first and second signal lines 137*b* and 137*c* can be disposed at a first surface of the base member 137*a* in parallel with the second direction Y and can be spaced apart from each other or electrically separated from each other along the first direction X. The first and second signal lines 137*b* and 137*c* can be disposed in parallel to each other at the first surface of the base member 137*a*. For example, the first and second signal lines 137*b* and 137*c* can be implemented in a line shape by patterning of a metal layer (or a conductive layer) formed or deposited at the first surface of the base member 137*a*.

End portions (or distal end portions or one sides) of the first and second signal lines 137*b* and 137*c* can be separated from each other, and thus, can be individually curved or bent.

The end portions (or distal ends portion or one side) of the first and second signal lines 137*b* and 137*c* can be individually curved or bent by being separated from each other.

The end portion (or the distal end portion or the one side or the one portion) of the first signal line 137*b* can be electrically connected to the first electrode layer 131*b* of the vibration part 131. For example, the end portion of the first signal line 137*b* can be electrically connected to at least a portion of the first electrode layer 131*b* of the vibration part 131 in the one periphery portion of the first cover member 133*a*. For example, the end portion (or the distal end portion or the one side or the one portion) of the first signal line 137*b* can be electrically and directly connected to at least a portion of the first electrode layer 131*b* of the vibration part 131. For example, the end portion (or the distal end portion or the one side or the one portion) of the first signal line 137*b* can be electrically connected to or directly contact the first electrode layer 131*b* of the vibration part 131. For example, the end portion of the first signal line 137*b* can be electrically connected to the first electrode layer 131*b* by a conductive double-sided tape. Accordingly, the first signal line 137*b* can be configured to supply a first driving signal, supplied from the driving circuit part, to the first electrode layer 131*b* of the vibration part 131.

The end portion (or the distal end portion or the one side or the one portion) of the second signal line 137*c* can be electrically connected to the second electrode layer 131*c* of the vibration part 131. For example, the end portion of the second signal line 137*c* can be electrically connected to at least a portion of the second electrode layer 131*c* of the vibration part 131 in the one periphery portion of the second cover member 133*d*. For example, the end portion of the second signal line 137*c* can be electrically and directly connected to at least a portion of the second electrode layer 131*c* of the vibration part 131. For example, the end portion of the second signal line 137*c* can be electrically connected to or directly contact the second electrode layer 131*c* of the vibration part 131. For example, the end portion of the second signal line 137*c* can be electrically connected to the second electrode layer 131*c* by a conductive double-sided tape. Accordingly, the second signal line 137*c* can be configured to supply a second driving signal, supplied from the driving circuit part, to the second electrode layer 131*c* of the vibration part 131.

The signal supply member 137 according to an embodiment of the present disclosure can further include an insulation layer 137*d*.

The insulation layer 137*d* can be disposed at the first surface of the base member 137*a* to cover each of the first signal line 137*b* and the second signal line 137*c* other than the end portion (or one side) of the signal supply member 137.

According to an embodiment of the present disclosure, an end portion (or one side or one portion) of the signal supply member 137 including an end portion (or one side or one portion) of the base member 137*a* and an end portion (or one side or one portion) 137*da* of the insulation layer 137*d* can be inserted (or accommodated) between the cover member 133 and the vibration part 131 and can be fixed between the cover member 133 and the vibration part 131 by a first adhesive layer 133*b* and the second adhesive layer 133*c*.

According to another embodiment of the present disclosure, an end portion (or one side) of the signal supply member 137 including an end portion (or one side or one portion) of the base member 137*a* and an end portion (or one side or one portion) 137*da* of the insulation layer 137*d* can be inserted (or accommodated) between the first cover member 133*a* and the second cover member 133*d* and can be fixed between the first cover member 133*a* and the second cover member 133*d* by a first adhesive layer 133*b* and the second adhesive layer 133*c*. Accordingly, the end portion (or one side or one portion) of the first signal line 137*b* can be maintained with being electrically connected to the first electrode layer 131*b* of the vibration part 131, and the end portion (or one side or one portion) of the second signal line 137*c* can be maintained with being electrically connected to the second electrode layer 131*c* of the vibration part 131. In addition, the end portion (or one side or one portion) of the signal supply member 137 can be inserted (or accommodated) and fixed between the vibration part 131 and the first cover member 133*a*, and thus, a contact defect between the vibration apparatus 130 and the signal supply member 137 caused by the movement of the signal supply member 137 can be prevented.

In the signal supply member 137 according to an embodiment of the present disclosure, each of the end portion (or one side) of the base member 137*a* and the end portion (or one side or one portion) 137*da* of the insulation layer 137*d* can be removed. For example, each of the end portion of the first signal line 137*b* and the end portion of the second signal line 137*c* can be exposed at the outside without being supported or covered by each of the end portion (or one side or one portion) of the base member 137*a* and the end portion (or one side or one portion) 137*da* of the insulation layer 137*d*, respectively. In addition, the end portion (or one side or one portion) of each of the first signal line 137*b* and the second signal line 137*c* can protrude (or extend) to have a certain length from an end of the base member 137*a* or an end of the insulation layer 137*d*. Accordingly, each of the end portion (or the distal end portion or the one side or one portion) of each of the first signal line 137*b* and the second signal line 137*c* can be individually or independently bent.

The end portion (or one side or one portion) of the first signal line 137*b*, which is not supported by the end portion (or one side or one portion) of the base member 137*a* and the end portion (or one side or one portion) 137*da* of the insulation layer 137*d*, can be directly connected to or directly contact the first electrode layer 131*b* of the vibration part 131. The end portion (or one side or one portion) of the second signal line 137*c*, which is not supported by the end portion (or one side or one portion) of the base member 137*a* and the end portion (or one side or one portion) 137*da* of the insulation layer 137*d*, can be directly connected to or directly contact the second electrode layer 131*c* of the vibration part 131.

According to an embodiment of the present disclosure, a portion of the signal supply member 137 or a portion of the base member 137*a* can be disposed or inserted (or accommodated) between the cover member 133 and the vibration part 131, and thus, the signal supply member 137 can be integrated as one body with the vibration part 131. Further, a portion of the signal supply member 137 or a portion of the base member 137*a* can be disposed or inserted (or accommodated) between the first cover member 133*a* and the second cover member 133*d*, and thus, the signal supply member 137 can be integrated as one body with the vibration apparatus 130. Accordingly, the vibration apparatus 130 and the signal supply member 137 can be configured as one part (or one element or one component), and thus, an effect of uni-materialization can be obtained.

According to an embodiment of the present disclosure, the first signal line 137*b* and the second signal line 137*c* of the signal supply member 137 can be integrated as one body with the vibration apparatus 130, and thus, a soldering process for an electrical connection between the vibration apparatus 130 and the signal supply member 137 is not needed. Accordingly, a manufacturing process and a structure of the vibration apparatus 130 can be simplified, and hazards associated with the soldering process can be reduced.

The piezoelectric material included in the vibration layer 131*a* according to the embodiment of the present disclosure can include a perovskite crystal structure. In the perovskite crystal structure, the poling is changed by the change in position of central ion by an external stress or a magnetic field, and the piezoelectric effect can be generated according to the change in poling. For example, the perovskite crystal structure can be transformed from a symmetric structure such as a cubic shape into an unsymmetric structure such as a tetragonal, orthorhombic, and rhombohedral shape by an external stress or a magnetic field, to thereby generate the piezoelectric effect.

The piezoelectric material can have a piezoelectric constant (or piezoelectric deformation coefficient) d33 indicating a degree of deformation or a piezoelectric characteristic according to a voltage applied from the external. Since the piezoelectric material having a large piezoelectric constant can generate a large vibration even at a small voltage, it is possible to reduce a power consumption of the apparatus to which the vibration part 131 of the piezoelectric material is applied. In addition, since the piezoelectric material having a large piezoelectric constant can generate a large vibration even with a small thickness, it is possible to reduce the thickness of the apparatus to which the vibration part 131 of the piezoelectric material is applied.

In the piezoelectric material, the piezoelectric constant d33 indicating a piezoelectric characteristic can be affected by a phase transition temperature $T_C$.

Referring to FIG. 6, the phase transition temperature $T_C$ can have a relationship in inverse proportion to the piezoelectric constant d33. For example, the phase transition temperature Tc can be a temperature at which the phase transitions from tetragonal to cubic. The phase transition temperature $T_C$ can be a temperature corresponding to tetragonal. The piezoelectric material can have a lower piezoelectric characteristic at the phase transition temperature $T_C$ and can have a characteristic in which the piezoelectric characteristic gradually disappears according to the long-term preservation and use at a temperature lower than or equal to the phase transition temperature $T_C$.

In order to improve the piezoelectric characteristic of the piezoelectric material, the piezoelectric constant d33 can require 800 pC/N or more. As the piezoelectric constant d33 increases, the phase transition temperature $T_C$ becomes lower. For example, in order to maintain the piezoelectric characteristic even at a temperature below the phase transition temperature Tc, the piezoelectric material having a range of 50% to 70% of the phase transition temperature Tc can be configured. Accordingly, the piezoelectric constant d33 can have a degree of about 500 pC/N to 600 pC/N, and the phase transition temperature $T_C$ can configure the piezoelectric material having a temperature of 200° C. or higher, but a high voltage should be applied to have a high sound pressure characteristic. In order to solve this limitation, the thickness of the vibration apparatus can be formed to be thin, however, an electric field can be increased and vibration element constituting several vibration parts can be configured to compensate for low vibration characteristic (or vibration force) caused by the thinned thickness. The vibration element constituting the plurality of vibration parts has a very high Young's modulus of the vibration element, so that a reproduction band of sound is limited to a high-pitched sound band. In order to apply the vibration element to the field of vehicular apparatus, a piezoelectric material, which is a vibration part capable of maintaining the piezoelectric characteristic at a high temperature, for example, at a temperature of 110° C. or higher, should be formed. Therefore, there is a problem in that a piezoelectric material having a high phase transition temperature cannot be constructed while having a desired piezoelectric characteristic.

Figure 7:
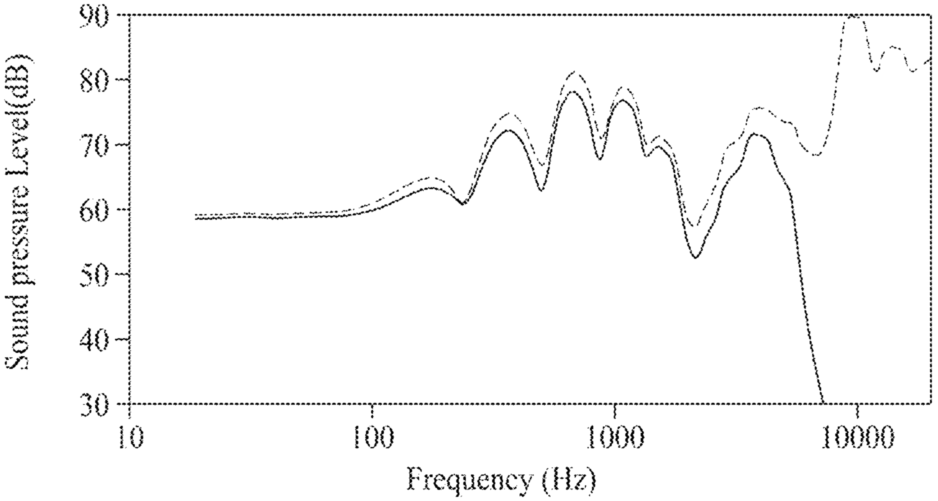
FIG. 7 is a diagram illustrating sound output characteristics of an apparatus according to an experimental example of the present disclosure.

FIG. 7 shows sound output characteristics of an apparatus according to an experimental example of the present disclosure.

The sound output characteristics can be measured in an anechoic chamber by a sound analysis equipment. The sound analysis equipment can include a sound card for transmitting and receiving sound to and from a control PC, an amplifier for amplifying and transmitting the sound generated from the sound card to the vibration apparatus, and a microphone for collecting sound generated in a display panel according to driving of the vibration apparatus. For example, the microphone can be placed at distance of 50 cm from the front of the vibration apparatus in the display panel. The sound or frequency response collected by the microphone is input to the control PC through the sound card and is checked in a control program to analyze the sound output characteristics of the vibration apparatus. For example, a sound pressure characteristic of a frequency range of about 100 Hz to about 20 kHz can be measured using a pulse program. The sound output characteristic method does not limit the content of the present disclosure.

A dotted line of FIG. 7 indicates the sound output characteristics of the vibration apparatus. A solid line of FIG. 7 indicates the sound output characteristics of the vibration apparatus after 100 hours. In FIG. 7, a horizontal axis indicates a frequency Hz (hertz), and a vertical axis indicates a sound pressure level dB (decibel).

Referring to FIGS. 4 and 5, a second adhesive layer 133*c* and a second cover member 133*d* can protect the vibration part 131 or the vibration layer 131*a* from external impact or contamination. The second adhesive layer 133*c* and the second cover member 133*d* can be attached to the rear surface of the vibration member or vehicle interior material (or exterior material). For example, when the second adhesive layer 133*c* and the second cover member 133*d* are integrally configured to form one layer as an adhesive, the adhesive can be made of a thermoplastic adhesive or a pressure sensitive adhesive PSA. The thermoplastic adhesive or pressure sensitive adhesive PSA can be softened when it is exposed to a high temperature. Since the vibration part 131 or the vibration layer 131*a* repeats contraction and/or expansion according to a signal (or voltage) applied from the outside and continuously produces a vibration displacement, the vibration part 131 or the vibration layer 131*a* can be separated from the adhesive which is the thermoplastic adhesive or pressure sensitive adhesive PSA. Accordingly, a signal supply member 137 for applying the signal to the vibration part 131 or the vibration layer 131*a* can also be separated from the vibration part 131 or the vibration layer 131*a*. Accordingly, it can have a problem of a crack occurring in the vibration layer 131*a*. If the vibration displacement generates largely by applying the high voltage in a state where the crack is generated in the vibration layer 131*a*, first and second electrode layers 131*b* and 131*c* become closer to each other, whereby a burnt can be generated in the vibration part 131.

Referring to FIG. 7, if the signal supply member 137 is separated from the vibration part 131 or the vibration layer 131*a*, a signal is not applied, whereby a sound pressure is reduced.

For example, at 300 Hz to 8 kHz, a dotted line is a sound pressure of about 71.70 dB, and a solid line corresponding to a sound pressure after 100 hours is measured to be about 64.60 dB. Accordingly, it is known that the sound pressure after 100 hours is reduced by about 7.10 dB from the beginning sound pressure.

For example, at 200 Hz to 20 kHz, a dotted line is a sound pressure of about 73.50 dB, and a solid line corresponding to a sound pressure after 100 hours is measured to be about 55.20 dB. Accordingly, it is known that the sound pressure after 100 hours is reduced by about 18.33 dB from the beginning sound pressure.

Therefore, in order to construct a piezoelectric material having a high piezoelectric characteristic and a high phase transition temperature and to form a piezoelectric material capable of having reliability at a high temperature, the inventors of the present disclosure have conducted various studies and experiments. Through the various studies and experiments, the piezoelectric material having the high piezoelectric characteristic, the high phase transmission temperature, and reliability at a high temperature has been constructed.

The vibration part 131 or the vibration layer 131*a* according to an embodiment of the present disclosure can include a piezoelectric material and an electrostrictive material.

The electrostrictive material is a material which is highly deformed by an applied electric field (or voltage), and has a high dielectric constant, however, can have a low piezoelectric constant and a low phase transition temperature.

When the vibration apparatus is configured with only the piezoelectric material, it has a small displacement of 'nm' level. Thus, there is a problem in that it is difficult to have a desired sound pressure characteristic when applied to a large-sized apparatus or the like.

When the ratio of electrostrictive material becomes higher than the ratio of piezoelectric material, a dielectric constant increases, and thus a piezoelectric constant can increase. Since the piezoelectric constant is inversely proportional to the phase transition temperature, the phase transition temperature is lowered. Therefore, there is a problem that it cannot be applied to fields such as vehicles requiring reliability at a high temperature.

The inventors of the present disclosure have conducted various studies and experiments on the ratio of the electrostrictive material and the piezoelectric material. Through the various studies and experiments, the ratio of the electrostrictive material and the piezoelectric material has been conducted. Accordingly, it is possible to provide the vibration apparatus including the vibration part or vibration layer which can have stable characteristics in various fields of application to which the vibration apparatus is applied and does not change the phase transition temperature $T_C$ at the entire temperature range including the high temperature.

The electrostrictive material according to an embodiment of the present disclosure can include materials represented by Equations 1 and 2 below.

$$(Pb_{A-B}C_B)(Mg_{1/3}Nb_{2/3})_aO_3 \quad \text{[Equation 1]}$$

$$(Pb_{A-B}C_B)(D_{1/3}E_{2/3})_bO_3 \quad \text{[Equation 2]}$$

In Equation 1 and Equation 2, 'C' is one of calcium Ca, strontium Sr, and barium Ba, 'D' is one of nickel Ni, manganese Mn, magnesium Mg, and cobalt Co, 'E' is niobium Nb or tantalum Ta, and it satisfies that $0.02 \le B \le 0.20$, $0.80 \le A-B \le 0.98$, $0.05 \le a \le 0.25$, and $0.05 \le b \le 0.25$.

The piezoelectric material according to an embodiment of the present disclosure can include materials represented by Equations 3 and 4 below.

$$(Pb_{A-B}C_B)(Zr_c)O_3 \quad \text{[Equation 3]}$$

$$(Pb_{A-B}C_B)(Ti_d)O_3 \quad \text{[Equation 4]}$$

In Equation 3 and Equation 4, 'C' is one of calcium Ca, strontium Sr, and barium Ba, 'D' is one of nickel Ni, manganese Mn, magnesium Mg, and cobalt Co, 'E' is niobium Nb or tantalum Ta, and it satisfies that $0.02 \le B \le 0.20$, $0.80 \le A-B \le 0.98$, $0.10 \le c \le 0.50$, and $0.10 \le d \le 0.50$.

The vibration part according to an embodiment of the present disclosure can include a material represented by Equation 5 below.

$$(Pb_{A-B}C_B)((Mg_{1/3}Nb_{2/3})_a(D_{1/3}E_{2/3})_b(Zr_cTi_d))O_3 \quad \text{[Equation 5]}$$

In Equation 5, 'C' is one of calcium Ca, strontium Sr, and barium Ba, 'D' is one of nickel Ni, manganese Mn, magnesium Mg, and cobalt Co, 'E' is niobium Nb or tantalum Ta, and it satisfies that $a+b+c+d=1$, $0.02 \le B \le 0.20$, $0.80 \le A-B \le 0.98$, $0.05 \le a \le 0.25$, $0.05 \le b \le 0.25$, $0.10 \le s \le 0.50$, and $0.10 \le d \le 0.50$.

According to an embodiment of the present disclosure, the piezoelectric materials of Equations 3 and 4 can be classified into rhombohedral, orthorhombic, tetragonal, and monoclinic at a room temperature. For example, a crystal structure can be determined according to the ratio of 'c' and 'd' in Equations 3 and 4. The crystal structure determined according to the ratio of 'c' and 'd' changes from rhombohedral to tetragonal, and changes from tetragonal to cubic. In addition, the piezoelectric characteristic changes at the temperature at which the crystal structure is changed. Therefore, the piezoelectric material should be formed to have the crystal structure in which the phase transition temperature $T_C$ does not change.

In Equation 3 and Equation 4, 'c' and 'd' can be configured to have the same value or different values. For example, when 'd' has a value greater than 'c', it has the high phase transition temperature Tc, whereby the change in the piezoelectric characteristic can decrease as the temperature increases. When 'c' has a value greater than 'd', the piezoelectric material can have the rhombohedral structure, and can have unstable characteristic as compared to the case when 'd' has a value greater than 'c' according to the increase of temperature. When 'd' has a value greater than 'c', it can have the more stable characteristic in which the piezoelectric characteristic is not changed at or below the phase transition temperature $T_C$. For example, 'c' can be 0.25 to 0.37. For example, 'd' can be 0.30 to 0.40.

For example, in case of rhombohedral phase, orthorhombic phase, tetragonal phase, and monoclinic phase, etc., the crystal structure can be changed to be the unstable state when the phase transition temperature $T_C$ is reached. In comparison, in case of a pseudo cubic phase, the crystal can have a structure in which a crystalline phase change is small compared to another crystal structure. The electrostrictive material of Equations 1 and 2 according to an embodiment of the present disclosure can have a pseudo cubic crystal structure. The electrostrictive material can be a relaxor, but embodiments of the present disclosure are not limited thereto.

For example, in Equation 2, 'D' can be one of nickel Ni, manganese Mn, magnesium Mg, and cobalt Co. 'E' can be niobium Nb or tantalum Ta. For example, if 'D' is nickel Ni and 'E' is niobium Nb, the electrostrictive material can be $(Pb_{A-B}C_B)(Ni_{1/3}Nb_{2/3})_bO_3$. For example, when 'D' is manganese Mn and 'E' is niobium Nb, the electrostrictive material can be $(Pb_{A-B}C_B)Mn_{1/3}Nb_{2/3})_bO_3$. For example, when 'D' is magnesium Mg and 'E' is niobium Nb, the electrostrictive material can be $(Pb_{A-B}C_B)(Mg_{1/3}Nb_{2/3})_bO_3$. For example, when 'D' is nickel Ni and 'E' is tantalum Ta, the electrostrictive material can be $(Pb_{A-B}C_B)(Ni_{1/3}Ta_{2/3})_bO_3$. For example, when 'D' is magnesium Mg and 'E' is tantalum Ta, the electrostrictive material can be $(Pb_{A-B}C_B)(Mg_{1/3}Ta_{2/3})_bO_3$. For example, when 'D' is cobalt Co and 'E' is tantalum Ta, the electrostrictive material can be $(Pb_{A-B}C_B)(CO_{1/3}Ta_{2/3})_bO_3$.

In Equation 1 and Equation 2, the values of 'a' and 'b' can be configured to have the same or different values. For example, 'a' and 'b' can have the same value as 0.10 to 0.20. For example, 'a' can be 0.10 to 0.20, and 'b' can be 0.10 to 0.15. For example, when 'a' is greater than 'b', it is possible to configure the electrostrictive material having a relatively high dielectric constant and a high phase transition temperature $T_C$.

According to an embodiment of the present disclosure, the ratio of 'a+b' in Equations 1 and 2 and 'c+d' in Equations 3 and 4 can be 1.0:1.7 to 1.0:3.0. For example, the ratio of 'a+b' of the electrostrictive material in Equations 1 and 2 and 'c+d' of the piezoelectric material in Equations 3 and 4 can be 1.0:1.7 to 1.0:3.0. The ratio of 'a+b' in Equations 1 and 2 and 'c+d' in Equations 3 and 4 can be 1.0:1.9 to 1.0:2.8. For example, the ratio of 'a+b' of the electrostrictive material in Equations 1 and 2 and 'c+d' of the piezoelectric material in Equations 3 and 4 can be 1.0:1.9 to 1.0:2.8.

If the ratio of 'a+b' and 'c+d' is less than 1.0:1.7, the phase transition temperature Tc can be 160° C. or less, which can deteriorate reliability at a high temperature. If the ratio of 'a+b' and 'c+d' is greater than 1.0:3.0, the piezoelectric constant d33 can be rapidly decreased, whereby the sound pressure characteristic can be deteriorated.

According to an embodiment of the present disclosure, the vibration part 131 can have a phase transition temperature $T_C$ of 160° C. or more and 180° C. or less. The vibration part 131 can have a piezoelectric constant d33 of 900 pC/N or more to 1,100 pC/N or less.

According to an embodiment of the present disclosure, at least one of first cover member 133*a* and second cover member 133*d* can prevent external moisture from penetrating into the vibration part 131 or the vibration layer 131*a* and can protect the vibration part 131 or the vibration layer 131*a* from an external impact. At least one of the first cover member 133*a* and the second cover member 133*d* can be formed of a material having water vapor transmission rate WVTR and heat resistance. In order to prevent the penetration of moisture into the vibration part 131 or the vibration layer 131*a* in a high-humidity environment (e.g., 85° C. and 85% RH(Relative Humidity)), the water vapor transmission rate WVTR should not exceed $10^2$ g·day/$m^2$, but embodiments of the present disclosure are not limited thereto. At least one of the first cover member 133*a* and the second cover member 133*d* according to an embodiment of the present disclosure can be a polyimide film, a polyethylene terephthalate film, or a polyethylene naphthalate film, but embodiments of the present disclosure are not limited thereto.

The adhesive layers 133*b* and 133*c* according to an embodiment of the present disclosure can be formed of a material having a high adhesive force between one of the first cover member 133*a* and the second cover member 133*d* and the vibration layer 131*a* and having a small change according to a temperature change after curing the adhesive layers 133*b* and 133*c*. Accordingly, it is possible to implement the vibration apparatus having the adhesive layers 133*b* and 133*c* having improved stability according to the temperature change. For example, the adhesive layers 133*b* and 133*c* can be a material of epoxy-based thermosetting resin, but embodiments of the present disclosure are not limited thereto. For example, the epoxy can include bisphenol-based, polyurethane, or rubber-based material, but embodiments of the present disclosure are not limited thereto. As another example, the adhesive layers 133*b* and 133*c* can be formed of thermoplastic resin or pressure sensitive adhesive PSA. For example, a curing process of the adhesive layers 133*b* and 133*c* can be performed at 150° C. to 170° C., but embodiments of the present disclosure are not limited thereto.

According to an embodiment of the present disclosure, the first cover member 133*a* and the second cover member 133*d* can have the same size as the adhesive layers 133*b* and 133*c*. For example, the sizes of the first cover member 133*a*, the second cover member 133*d*, and the adhesive layers 133*b* and 133*c* can be larger than the size of the vibration layer 131*a*, but embodiments of the present disclosure are not limited thereto. Accordingly, it is possible to protect the vibration layer 131*a* from external moisture.

According to an embodiment of the present disclosure, in order to solve a problem of damages on signal wiring caused by the signal supply member 137 melted in a high-temperature process corresponding to the curing process of the adhesive layers 133*b* and 133*c*, the signal supply member 137 can be formed of a material having heat resistance. For example, the signal supply member 137 can be formed of a polyimide material, a polyethylene terephthalate material, or a polyethylene naphthalate material, but embodiments of the present disclosure are not limited thereto.

The vibration apparatus according to an embodiment of the present disclosure can be configured to include at least one of the vibration layer 131*a* having the improved piezoelectric characteristic, the cover member 133*a* and 133*d* including one film having moisture permeability and heat resistance among the polyimide film, the polyethylene terephthalate film and the polyethylene naphthalate film, the adhesive layer 133*b* and 133*c* including the thermoplastic resin or pressure sensitive adhesive PSA having reliability according to the temperature change, and the signal supply member 137 including one material having heat resistance among the polyimide material, polyethylene terephthalate material, and polyethylene naphthalate material having heat resistance.

According to an embodiment of the present disclosure, it is possible to provide the vibration apparatus configured to include at least one of the vibration layer 131*a* having improved piezoelectric characteristics, the cover members 133*a* and 133*d* having moisture permeability and heat resistance, the adhesive layers 133*b* and 133*c* having reliability according to temperature change, and the signal supply member 137 having heat resistance.

Figure 8:
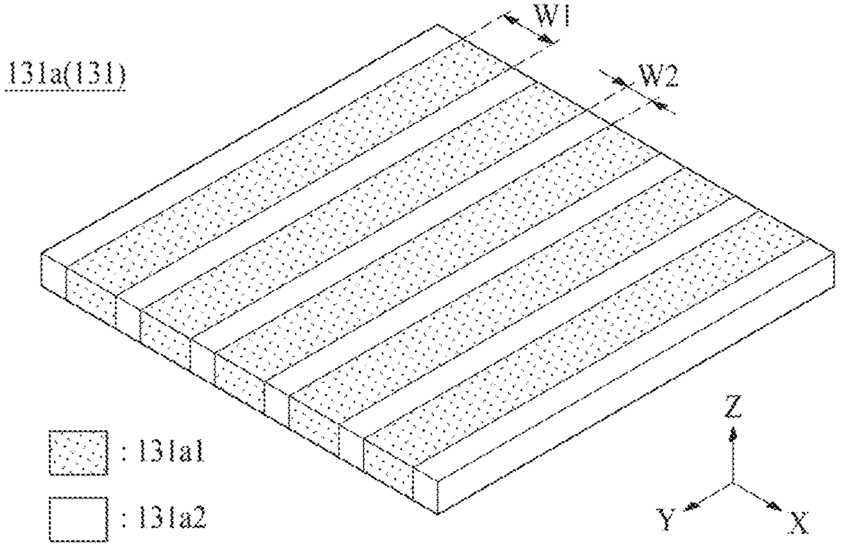
FIG. 8 is a perspective view illustrating a vibration part according to another embodiment of the present disclosure.

FIG. 8 is a perspective view illustrating a vibration part according to another embodiment of the present disclosure, and illustrates another embodiment of the vibration layer described above with reference to FIGS. 3 to 7.

Referring to FIGS. 4 and 8, the vibration layer 131*a* according to another embodiment of the present disclosure can include a plurality of first portions 131*al* and a plurality of second portions 131*a*2. For example, the plurality of first portions 131*al* and the plurality of second portions 131*a*2 can be alternately and repeatedly disposed along a first direction X (or second direction Y).

Each of the plurality of first portions 131*al* can include an inorganic material portion having a piezoelectric effect (or a piezoelectric characteristic). For example, each of the plurality of first portions 131*al* can include at least one of a piezoelectric inorganic material and a piezoelectric organic material. Further, each of the plurality of first portions 131*al* can be an inorganic portion, an inorganic material portion, a piezoelectric portion, a piezoelectric material portion, or an electroactive portion, but embodiments of the present disclosure are not limited thereto.

According to an embodiment of the present disclosure, each of the plurality of first portions 131*al* can have a first width W1 parallel to the first direction X (or the second direction Y) and can be extended along the second direction Y (or the first direction X). Each of the plurality of first portions 131_a1_ can be substantially a same as a vibration layer 131_a_ described above with reference to FIGS. 3 to 5, and thus, repeated descriptions thereof can be omitted.

Each of the plurality of second portions 131_a_2 can be disposed between the plurality of first portions 131_a_1. For example, each of the plurality of first portions 131_a1_ can be disposed between two adjacent second portions 131_a_2 of the plurality of second portions 131_a_2. Each of the plurality of second portions 131_a_2 can have a second width W2 parallel to the first direction X (or the second direction Y) and can be extended along the second direction Y (or the first direction X). The first width W1 can be a same as or different from the second width W2. For example, the first width W1 can be greater than the second width W2. For example, the first portion 131_a1_ and the second portion 131_a_2 can include a line shape or a stripe shape which has a same size or different sizes.

Each of the plurality of second portions 131_a_2 can be configured to fill a gap between two adjacent first portions of the plurality of first portions 131_a1_. Each of the plurality of second portions 131_a_2 can be configured to fill a gap between two adjacent first portions of the plurality of first portions 131_a1_, and thus, can be connected to or attached at lateral surfaces of the first portion 131_a1_ adjacent thereto. According to an embodiment of the present disclosure, each of the plurality of first portions 131_a1_ and the plurality of second portions 131_a_2 can be disposed (or arranged) at a same plane (or a same layer) in parallel with each other. Therefore, the vibration layer 131_a_ can be expanded to a desired size or length by a lateral coupling (or connection) of the first portions 131_a1_ and the second portions 131_a_2.

According to an embodiment of the present disclosure, each of the plurality of second portions 131_a_2 can absorb an impact applied to the first portions 131_a_1, and thus, can enhance the total durability of the first portions 131_a1_ and provide flexibility to the vibration layer 131_a_. Each of the plurality of second portions 131_a_2 can include an organic material having a ductile characteristic. For example, each of the plurality of second portions 131_a_2 can include one or more of an epoxy-based polymer, an acrylic-based polymer, and a silicone-based polymer, but embodiments of the present disclosure are not limited thereto. For example, each of the plurality of second portions 131_a_2 can be an organic portion, an organic material portion, an adhesive portion, a stretch portion, a bending portion, a damping portion, or a ductile portion, but embodiments of the present disclosure are not limited thereto.

A first surface of each of the plurality of first portions 131_a1_ and the plurality of second portions 131_a_2 can be connected to the first electrode layer 131_b_ in common. A second surface of each of the plurality of first portions 131_a1_ and the plurality of second portions 131_a_2 can be connected to the second electrode layer 131_c_ in common.

The plurality of first portions 131_a1_ and the plurality of second portion 131_a_2 can be disposed (or connected) at a same plane, and thus, the vibration part 131 according to another embodiment of the present disclosure can have a single thin film-type. Accordingly, the vibration layer 131_a_ or the vibration apparatus 130 including the vibration layer 131_a_ according to another embodiment of the present disclosure can vibrate by the first portion 131_a1_ having a vibration characteristic and can be bent in a curved shape by the second portion 131_a_2 having flexibility.

Figure 9:
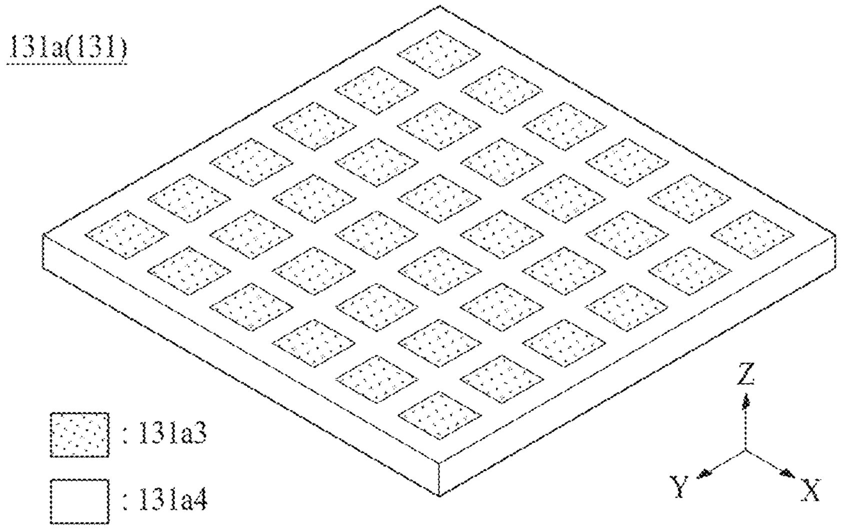
FIG. 9 is a diagram illustrating a vibration part according to another embodiment of the present disclosure.

FIG. 9 is a diagram illustrating a vibration part according to another embodiment of the present disclosure, and illustrates another embodiment of the vibration layer described above with reference to FIGS. 3 to 5.

Referring to FIGS. 4 and 9, the vibration layer 131_a_ according to another embodiment of the present disclosure can include a plurality of first portions 131_a_3 and a second portion 131_a_4 disposed between the plurality of first portions 131_a_3.

Each of the plurality of first portions 131_a_3 can be disposed to be spaced apart from one another along each of the first direction X and the second direction Y. For example, each of the plurality of first portions 131_a_3 can have a hexahedral shape having a same size and can be disposed in a lattice shape, but embodiments of the present disclosure are not limited thereto. For example, each of the plurality of first portions 131_a_3 can have a circular shape plate, an oval shape plate, or a polygonal shape plate, which has a same size as each other, but embodiments of the present disclosure are not limited thereto.

Each of the plurality of first portions 131_a_3 can be substantially a same as the first portion 131_a1_ described above with reference to FIG. 8, and thus, repeated descriptions thereof can be omitted.

The second portion 131_a_4 can be disposed between the plurality of first portions 131_a_3 along each of the first direction X and the second direction Y. The second portion 131_a_4 can be configured to fill a gap between two adjacent first portions 131_a_3, or to be adjacent to each of the plurality of first portions 131_a_3 or to surround each of the plurality of first portions 131_a_3, and thus, the second portion 131_a_4 can be connected to or attached at the first portion 131_a_3 adjacent thereto. The second portion 131_a_4 can be substantially a same as the second portion 131_a_2 described above with reference to FIG. 8, and thus, repeated descriptions thereof can be omitted.

A first surface of each of the plurality of first portions 131_a_3 and the second portions 131_a_4 can be connected to the first electrode layer 131_b_ in common. A second surface of each of the plurality of first portions 131_a_3 and the second portions 131_a_4 can be connected to the second electrode layer 131_c_ in common.

The plurality of first portions 131_a_3 and the second portion 131_a_4 can be disposed (or connected) at a same plane, and thus, the vibration layer 131_a_ according to another embodiment of the present disclosure can have a single thin film-type. Accordingly, the vibration part 131 or the vibration apparatus 130 including the vibration layer 131_a_ according to another embodiment of the present disclosure can vibrate by the first portion 131_a_3 having a vibration characteristic and can be bent in a curved shape by the second portion 131_a_4 having flexibility.

FIG. 10 is a diagram illustrating a vibration apparatus according to another embodiment of the present disclosure, and illustrates a vibration apparatus described above with reference to FIGS. 3 to 5, and 8 to 10.

Figure 10:
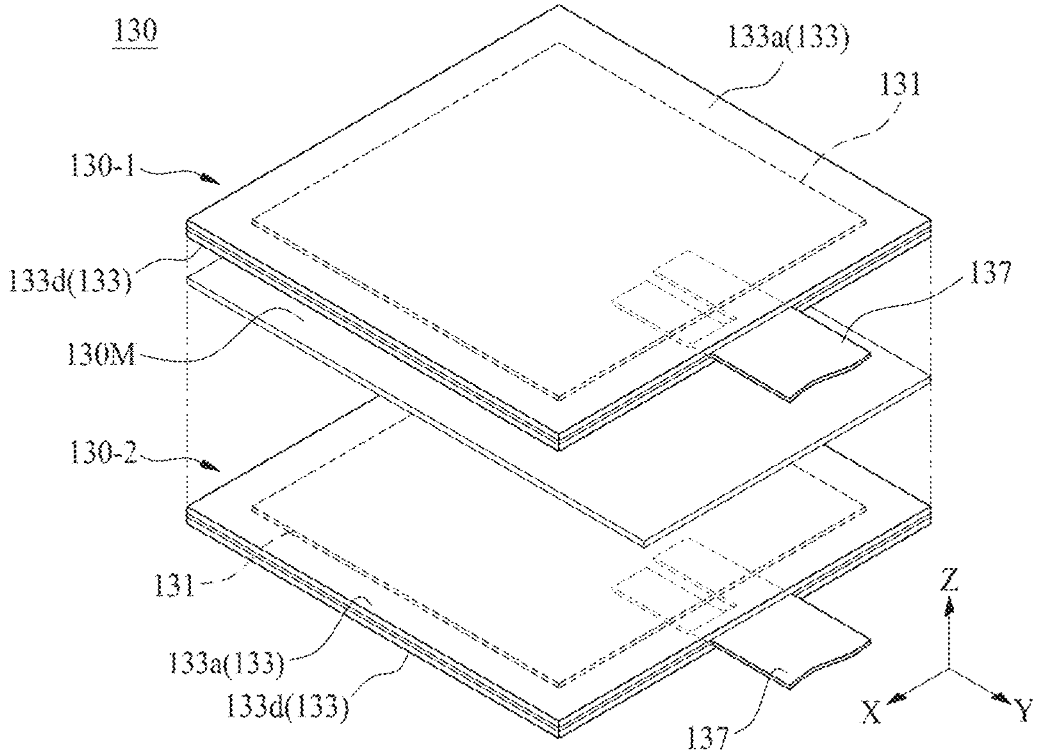
FIG. 10 is a diagram illustrating a vibration apparatus according to another embodiment of the present disclosure.

Referring to FIGS. 1, 2 and 10, the vibration apparatus 130 according to another embodiment of the present disclosure can include two or more vibration generating parts 130-1 and 130-2. For example, the vibration apparatus 130 can include a first vibration generating part 130-1 and a second vibration generating part 130-2.

The first vibration generating part 130-1 and the second vibration generating part 130-2 can overlap or be stacked with each other to be displaced (or driven or vibrated) in a same direction to maximize an amplitude displacement of the vibration apparatus 130 or an amplitude displacement of a vibration member. For example, the first vibration generating part 130-1 and the second vibration generating part 130-2 can have substantially a same size, but embodiments of the present disclosure are not limited thereto. For example, the first vibration generating part 130-1 and the second vibration generating part 130-2 can have substantially a same size within an error range of a manufacturing process, but embodiments of the present disclosure are not limited thereto. Therefore, the first vibration generating part 130-1 and the second vibration generating part 130-2 can maximize the amplitude displacement of the vibration apparatus 130 and/or the amplitude displacement of the vibration member.

According to an embodiment of the present disclosure, any one of the first vibration generating part 130-1 and the second vibration generating part 130-2 can be connected or coupled to the vehicle interior material 13 by the connection member. For example, the first vibration generating part 130-1 can be connected or coupled to the vehicle interior material 13 by the connection member.

Each of the first vibration generating part 130-1 and the second vibration generating part 130-2 can be a same as or substantially a same as the vibration apparatus 130 described above with reference to FIGS. 3 to 7, and thus, like reference numeral refer to like element and repeated descriptions thereof can be omitted.

The vibration apparatus 130 according to another embodiment of the present disclosure can further include an intermediate adhesive member 130M.

The intermediate adhesive member 130M can be disposed or connected between the first vibration generating part 130-1 and the second vibration generating part 130-2. As an embodiment of the present disclosure, the intermediate adhesive member 130M can be disposed or connected between the second adhesive layer 133*c* of the first vibration generating part 130-1 and the first cover member 133*a* of the second vibration generating part 130-2. As another embodiment of the present disclosure, the intermediate adhesive member 130M can be disposed or connected between the second cover member 133*d* of the first vibration generating part 130-1 and the first cover member 133*a* of the second vibration generating part 130-2. For example, the intermediate adhesive member 130M can be an intermediate member, an adhesive member, or a connection member, but embodiments of the present disclosure are not limited thereto.

The intermediate adhesive member 130M according to an embodiment of the present disclosure can be configured in a material including an adhesive layer which is good in adhesive force or attaching force with respect to each of the first vibration generating part 130-1 and the second vibration generating part 130-2. For example, the intermediate adhesive member 130M can include a foam pad, a double-sided tape, a double-sided foam tape, a double-sided foam pad, a double-sided adhesive tape, or an adhesive, or the like, but embodiments of the present disclosure are not limited thereto. For example, an adhesive layer of the intermediate adhesive member 130M can include epoxy, acrylic, silicone, or urethane, but embodiments of the present disclosure are not limited thereto. For example, the adhesive layer of the intermediate adhesive member 130M can include a urethane-based material (or substance) having relatively ductile characteristic. Accordingly, the vibration loss caused by displacement interference between the first vibration generating part 130-1 and the second vibration generating part 130-2 can be reduced or minimized, or each of the first vibration generating part 130-1 and the second vibration generating part 130-2 can be freely displaced (or vibrated or driven).

The vibration apparatus 130 according to another embodiment of the present disclosure can include the first vibration generating part 130-1 and the second vibration generating part 130-2 which are stacked (or piled or overlap) to vibrate (or displace or drive) in a same direction, and thus, the amount of displacement or an amplitude displacement can be maximized or increase. Accordingly, the amount of displacement (or a bending force or a driving force) or an amplitude displacement of the vibration member can be more maximized or more increased, thereby more enhancing sound characteristics and/or sound pressure level characteristics of a low-pitched sound band.

Figure 11:
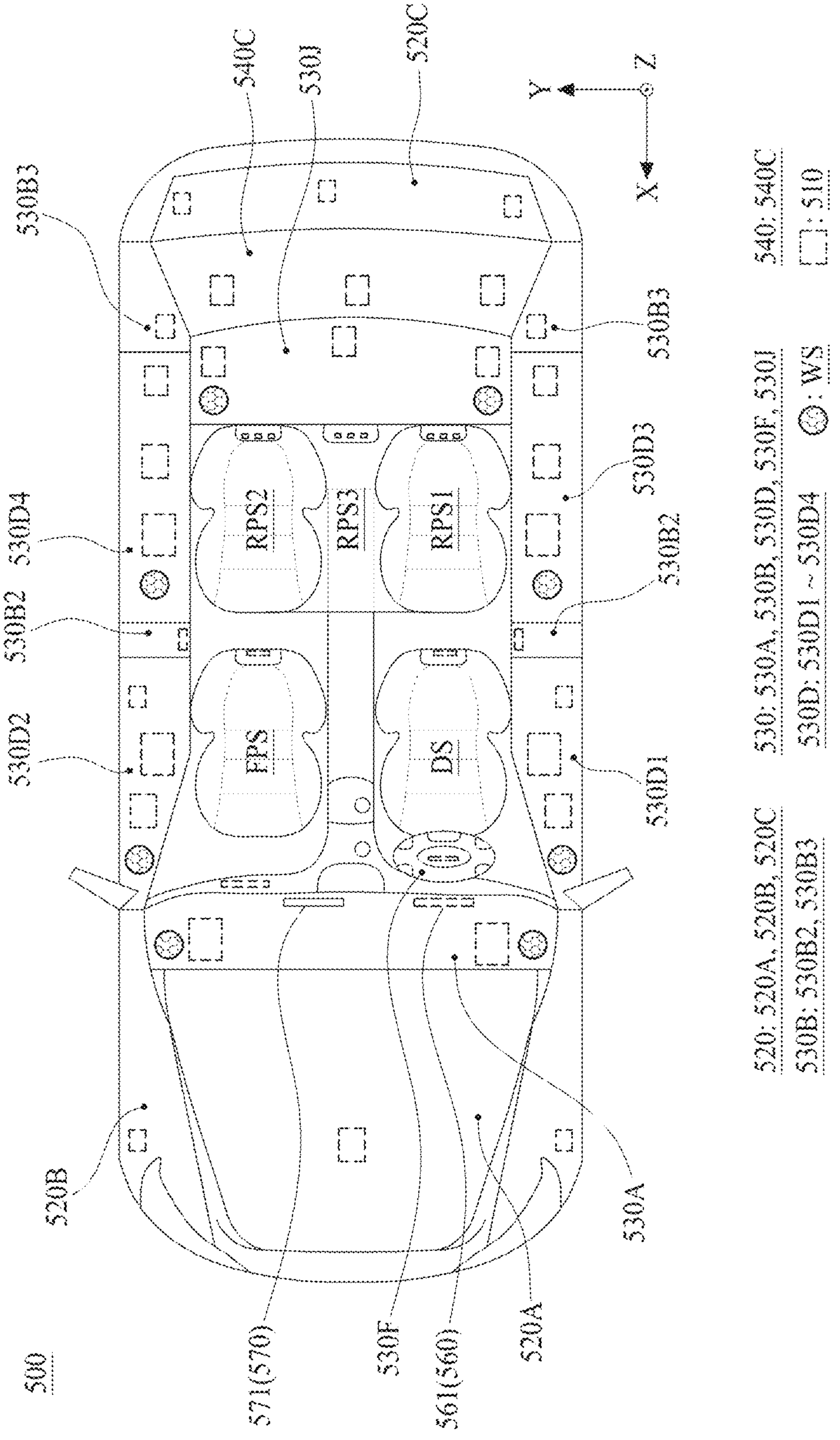
FIG. 11 is a diagram illustrating a vehicular apparatus according to an embodiment of the present disclosure.
Figure 12:
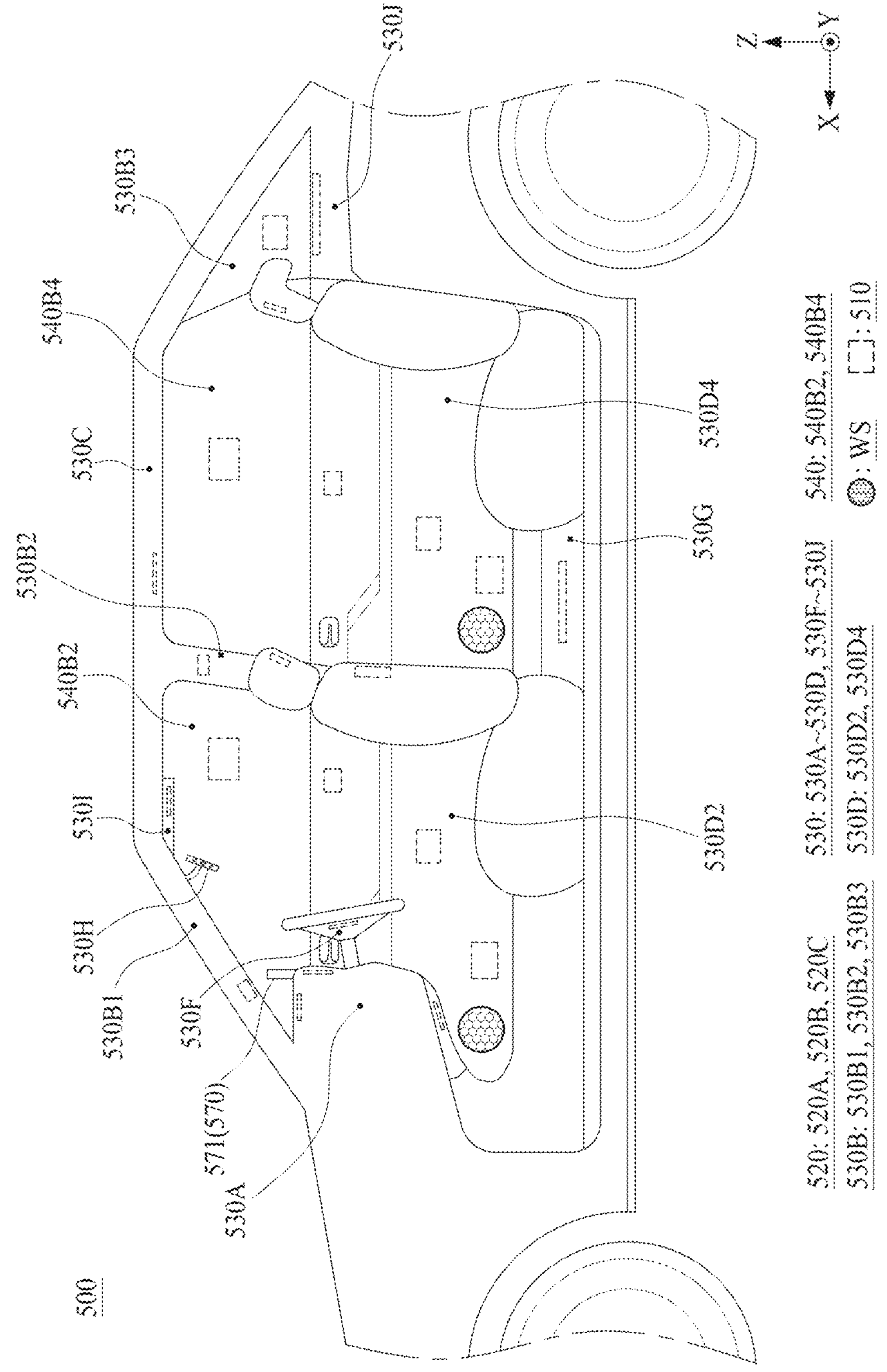
FIG. 12 is a cross-sectional view illustrating a vehicular apparatus according to an embodiment of the present disclosure.

FIG. 11 is a diagram illustrating a vehicular apparatus according to an embodiment of the present disclosure. FIG. 12 is a cross-sectional view illustrating a vehicular apparatus according to an embodiment of the present disclosure.

Referring to FIGS. 11 and 12, the vehicular apparatus 500 according to an embodiment of the present disclosure can include one or more sound generating apparatuses 510 configured to output a sound at one or more of an exterior material 520 and an interior material 530. For example, one or more of the exterior material 520 and the interior material 530 can output sound based on a vibration of the one or more sound generating apparatuses 510. In FIGS. 11 and 12, a portion indicated by a dotted line indicates a portion where one or more sound generating apparatuses 510 can be disposed.

The one or more sound generating apparatuses 510 can be disposed at the exterior material 520 or the interior material 530 or between the exterior material 520 and the interior material 530 to output a sound. For example, the one or more sound generating apparatuses 510 can be disposed at at least one of the exterior material 520, the interior material 530, and between the exterior material 520 and the interior material 530 to output a sound.

The interior material 530 according to an embodiment of the present disclosure can include at least one of a dashboard 530A, a pillar interior material 530B, a roof interior material 530C, a door interior material 530D, a seat interior material, a steering wheel interior material 530F, a floor interior material 530G, and a rear package interior material 530J, however, the present disclosure is not limited thereto. The one or more sound generating apparatuses 510 can vibrate at least one of the dashboard 530A, the pillar interior material 530B, the roof interior material 530C, the door interior material 530D, the seat interior material, the steering wheel interior material 530F, the floor interior material 530G, and the rear package interior material 530J. In addition, the one or more sound generating apparatuses 510 can be disposed between the exterior material 520 and at least one of the dashboard 530A, the pillar interior material 530B, the roof interior material 530C, the door interior material 530D, the seat interior material, the steering wheel interior material 530F and the floor interior material 530G. Therefore, the one or more sound generating apparatuses 510 can be output sounds of one or more channels.

Further, at least one of the one or more sound generating apparatuses 510 can be configured to be transparent or translucent. For example, when a window is entirely transparent, at least one of the one or more sound generating apparatuses 510 can be configured to be transparent and can be disposed at an intermediate area or a peripheral area of the window. When a glass window includes a translucent portion or an opaque portion, at least one of the one or more sound generating apparatuses 510 can be configured to be translucent or opaque and can be disposed to correspond to a portion or an opaque portion of the glass window. Additionally, at least one of the one or more sound generating apparatuses 510 can be a transparent vibration generator, a transparent vibration generating apparatus, or a transparent sound generating apparatus, but embodiments of the present disclosure are not limited thereto.

The one or more sound generating apparatuses 510 according to an embodiment of the present disclosure can be disposed between a dash panel and the dashboard 530A and can be configured to indirectly or directly vibrate the dashboard 530A to output a sound. For example, the one or more sound generating apparatuses 510 can include the vibration apparatus 130 described with reference to FIGS. 1 to 5, and 8 to 10, and thus, repeated descriptions thereof can be omitted. For example, the one or more sound generating apparatuses 510 can be a dashboard speaker or a first speaker, or the like, but embodiments of the present disclosure are not limited thereto.

According to an embodiment of the present disclosure, at least one of the dash panel and the dashboard 530A can include a first region corresponding to a driver seat DS, a second region corresponding to a front passenger seat FPS, and a third region (or a middle region) between the first region and the second region. One or more of the dash panel and the dashboard 530A can include a fourth region which is inclined to face the front passenger seat FPS. According to an embodiment of the present disclosure, the one or more sound generating apparatuses 510 can be disposed to vibrate at least one of the first to fourth regions of the dashboard 530A. In addition, the one or more sound generating apparatuses 510 can be disposed at each of the first and second regions of the dashboard 530A, or can be disposed at each of the first to fourth regions. For example, the one or more sound generating apparatuses 510 can be disposed at each of the first and second regions of the dashboard 530A, or can be disposed at at least one of the first to fourth regions. For example, the one or more sound generating apparatuses 510 can be configured to output a sound in a range of 150 Hz to 20 kHz. For example, the one or more sound generating apparatuses 510 configured to vibrate at least one of the first to fourth regions of the dashboard 530A can have a same sound output characteristic or different sound output characteristics. For example, the one or more sound generating apparatuses 510 configured to vibrate each of the first to fourth regions of the dashboard 530A can have a same sound output characteristic or different sound output characteristics.

The one or more sound generating apparatuses 510 according to an embodiment of the present disclosure can be disposed between a pillar panel and the pillar interior material 530B and can be configured to indirectly or directly vibrate the pillar interior material 530B to output a sound. For example, the one or more sound generating apparatuses 510 can include the vibration apparatus 130 described above with reference to FIGS. 1 to 5 and 8 to 10, and thus, repeated descriptions thereof can be omitted. For example, the one or more sound generating apparatuses 510 can be referred to as a pillar speaker, a tweeter speaker, or a second speaker, or the like, but embodiments of the present disclosure are not limited thereto.

According to an embodiment of the present disclosure, the pillar panel can include a first pillar (or an A pillar) which is disposed at both sides of a front window, a second pillar (or a B pillar) which is disposed at both sides of a center of a vehicle body, and a third pillar (or a C pillar) which is disposed at both sides of a rear portion of the vehicle body. The pillar interior material 530B can include a first pillar interior material 530B1 which covers the first pillar, a second pillar interior material 530B2 which covers the second pillar, and a third pillar interior material 530B3 which covers the third pillar. According to an embodiment of the present disclosure, the one or more sound generating apparatuses 510 can be disposed at one or more of a region between the first pillar and the first pillar interior material 530B1, a region between the second pillar and the second pillar interior material 530B2, and a region between the third pillar and the third pillar interior material 530B3, and thus, can vibrate at least one of the first to third pillar interior materials 530B1, 530B2, and 530B3. For example, the one or more sound generating apparatuses 510 can be configured to output a sound in a range of 2 kHz to 20 kHz, but embodiments of the present disclosure are not limited thereto. For example, the one or more sound generating apparatuses 510 can be configured to output a sound in a range of 150 Hz to 20 kHz. For example, the one or more sound generating apparatuses 510 configured to vibrate at least one of the first to third pillar interior materials 530B1, 530B2, and 530B3 can have a same sound output characteristic or different sound output characteristics.

The one or more sound generating apparatuses 510 according to an embodiment of the present disclosure can be disposed between a roof panel and the roof interior material 530C and can be configured to indirectly or directly vibrate the roof interior material 530C to output a sound. For example, the one or more sound generating apparatuses 510 can be configured to be transparent or translucent. For example, the one or more sound generating apparatuses 510 can include the vibration apparatus 130 described with reference to FIGS. 1 to 5 and 8 to 10, and thus, repeated descriptions thereof can be omitted. For example, the one or more sound generating apparatuses 510 can be a roof speaker or a third speaker, or the like, but embodiments of the present disclosure are not limited thereto.

According to an embodiment of the present disclosure, at least one of the roof panel and the roof interior material 530C covering the roof panel can include a first region corresponding to the driver seat DS, a second region corresponding to the front passenger seat FPS, a third region corresponding to a region between the driver seat DS and the front passenger seat FPS, a fourth region corresponding to a first rear passenger seat RPS1 behind the driver seat DS, a fifth region corresponding to a second rear passenger seat RPS2 behind the front passenger seat FPS, a sixth region corresponding to a region between the first rear passenger seat RPS1 and the second rear passenger seat RPS2, and a seventh region between the third region and the sixth region. For example, the one or more sound generating apparatuses 510 can be configured to vibrate at least one of the first to seventh regions of the roof interior material 530C. For example, the one or more sound generating apparatuses 510 can be configured to output a sound in a range of 150 Hz to 20 kHz. For example, the one or more sound generating apparatuses 510 configured to vibrate at least one of the first to seventh regions of the roof interior material 530C can have a same sound output characteristic or different sound output characteristics. For example, the one or more sound generating apparatuses 510 configured to vibrate each of the first to seventh regions of the roof interior material 530C can have a same sound output characteristic or different sound output characteristics. For example, at least one of the one or more sound generating apparatuses 510 configured to vibrate at least one of the first to seventh regions of the roof interior material 530C can be configured to output a sound in a range of 2 kHz to 20 kHz, and the other can be configured to output a sound in a range of 150 Hz to 20 KHz. For example, at least one of one or more sound generating apparatuses 510 configured to vibrate each of the first to seventh regions of the roof interior material 530C can be configured to output a sound in a range of 2 kHz to 20 kHz, and the other can be configured to output a sound in a range of 150 Hz to 20 KHz.

According to an embodiment of the present disclosure, the one or more sound generating apparatuses 510 can be disposed between a door frame and the door interior material 530D and can be configured to indirectly or directly vibrate the door interior material 530D to output a sound. For example, the one or more sound generating apparatuses 510 can include the vibration apparatus 130 described above with reference to FIGS. 1 to 5 and 8 to 10, and thus, repeated descriptions thereof can be omitted. For example, the one or more sound generating apparatuses 510 can be referred to as a door speaker or a fourth speaker, or the like, but embodiments of the present disclosure are not limited thereto.

According to an embodiment of the present disclosure, with respect to a height direction Z, at least one of the door frame and the door interior material 530D can include an upper region, a middle region, and a lower region. For example, the one or more sound generating apparatuses 510 can be disposed at at least one of an upper region, a middle region, and a lower region between the door frame and the door interior material 530D, and thus, can vibrate at least one of the upper region, the middle region, and the lower region of the door interior material 530D.

According to an embodiment of the present disclosure, an upper region of the door interior material 530D can include a curved portion having a relatively small radius of curvature. The one or more sound generating apparatuses 510 for vibrating the upper region of the door interior material 530D can be bent into a shape that follows a shape (or surface topology) of the curved portion of the upper region of the door interior material 530D due to the second portion 131*a*2 and 131*a*4 having flexibility of the vibration layer 131*a* described above with reference to FIGS. 8 and 9.

According to an embodiment of the present disclosure, the door frame can include a first door frame (or a left front door frame), a second door frame (or a right front door frame), a third door frame (or a left rear door frame), and a fourth door frame (or a right rear door frame).

According to an embodiment of the present disclosure, the door interior material 530D can include a first door interior material (or a left front door interior material) 530D1 covering the first door frame, a second door interior material (or a right front door interior material) 530D2 covering the second door frame, a third door interior material (or a left rear door interior material) 530D3 covering the third door frame, and a fourth door interior material (or a right rear door interior material) 530D4 covering the fourth door frame. For example, the one or more sound generating apparatuses 510 can be disposed at at least one of an upper region, a middle region, and a lower region between each of the first to fourth door frames and the first to fourth door interior materials 530D1 to 530D4, and thus, can vibrate at least one of the upper region, the middle region, and the lower region of each of the first to fourth door interior materials 530D1 to 530D4.

According to an embodiment of the present disclosure, the one or more sound generating apparatuses 510 configured to vibrate the upper region of each of the first to fourth door interior materials 530D1 to 530D4 can be configured to output a sound in a range of 2 kHz to 20 kHz, or can be configured to output a sound in a range of 150 Hz to 20 kHz. For example, the one or more sound generating apparatuses 510 configured to vibrate the upper region of at least one of the first to fourth door interior materials 530D1 to 530D4 can be configured to output a sound in a range of 2 kHz to 20 kHz, or can be configured to output a sound in a range of 150 Hz to 20 kHz.

According to an embodiment of the present disclosure, the one or more sound generating apparatuses 510 configured to vibrate the middle region or/and the lower region of at least one of the first to fourth door interior materials 530D1 to 530D4 can be configured to output a sound in a range of 150 Hz to 20 kHz. The one or more sound generating apparatuses 510 configured to vibrate the middle region or/and the lower region of each of the first to fourth door interior materials 530D1 to 530D4 can be configured to output a sound in a range of 150 Hz to 20 kHz. For example, the one or more sound generating apparatuses 510 configured to vibrate the middle region or/and the lower region of at least one of the first to fourth door interior materials 530D1 to 530D4 can be any one or more of a woofer, a mid-woofer, and a sub-woofer. For example, the one or more sound generating apparatuses 510 configured to vibrate the middle region or/and the lower region of each of the first to fourth door interior materials 530D1 to 530D4 can be any one or more of a woofer, a mid-woofer, and a sub-woofer.

Sounds output from each of the one or more sound generating apparatuses 510 disposed at the first door interior material 530D1 and the one or more sound generating apparatuses 510 disposed at the second door interior material 530D2 can be combined and output. For example, sounds output from at least one of one or more sound generating apparatuses 510 disposed at the first door interior material 530D1 and the one or more sound generating apparatuses 510 disposed at the second door interior material 530D2 can be combined and output. In addition, sounds output from the one or more sound generating apparatuses 510 disposed at the third door interior material 530D3 and sounds output from the one or more sound generating apparatuses 510 disposed at the fourth door interior material 530D4 can be combined and output.

According to an embodiment of the present disclosure, the upper region of each of the first to fourth door interior materials 530D1 to 530D4 can include a first upper region adjacent to the dashboard 530A, a second upper region adjacent to back seats RPS1, RPS2, and RPS3, and a third upper region between the first upper region and the second upper region. For example, the one or more sound generating apparatuses 510 can be disposed at one or more of the first to third upper regions of each of the first to fourth door interior materials 530D1 to 530D4. For example, the one or more sound generating apparatuses 510 can be disposed at the first upper region of each of the first and second door interior materials 530D1 and 530D2 and can be disposed at one or more of the second and third upper regions of each of the first and second door interior materials 530D1 and 530D2. For example, the one or more sound generating apparatuses 510 can be disposed at one or more of the first to third upper regions of at least one of the first to fourth door interior materials 530D1 to 530D4. For example, the one or more sound generating apparatuses 510 configured to vibrate the first upper region of one or more of the first and second door interior materials 530D1 and 530D2 can be configured to output a sound in a range of 2 kHz to 20 kHz, and the one or more sound generating apparatuses 510 configured to vibrate one or more of the second and third upper regions of each of the first and second door interior materials 530D1 and 530D2 can be configured to output a sound in a range of 2 kHz to 20 kHz or can be configured to output a sound in a range of 150 Hz to 20 kHz. For example, the one or more sound generating apparatuses 510 configured to vibrate one or more of the second and third upper regions of at least one of the first and second door interior materials 530D1 and 530D2 can be configured to output a sound in a range of 2 kHz to 20 kHz, or can be configured to output a sound in a range of 150 Hz to 20 KHz.

According to an embodiment of the present disclosure, one or more sound generating apparatuses 510 can be disposed between a seat frame and the seat interior material 530E and can be configured to indirectly or directly vibrate the seat interior material 530E to output a sound. For example, the one or more sound generating apparatuses 510 can include the vibration apparatus 130 described above with reference to FIGS. 1 to 5 and 8 to 10, and thus, repeated descriptions thereof can be omitted. For example, the one or more sound generating apparatuses 510 can be referred to as a sheet speaker, a headrest speaker, or a fifth speaker, or the like, but embodiments of the present disclosure are not limited thereto.

According to an embodiment of the present disclosure, the seat frame can include a first seat frame (or a driver seat frame), a second seat frame (or a front passenger seat frame), a third seat frame (or a first passenger seat frame), a fourth seat frame (or a second passenger seat frame), and a fifth seat frame (or a third passenger seat frame). According to an embodiment of the present disclosure, the seat interior material can include a first seat interior material surrounding the first seat frame, a second seat interior material surrounding the second seat frame, a third seat interior material surrounding the third seat frame, a fourth seat interior material surrounding the fourth seat frame, and a fifth seat interior material surrounding the fifth seat frame.

According to an embodiment of the present disclosure, at least one of the first to fifth seat frames can include a seat floor frame, a seat rear frame, and a headrest frame. The seat interior material can include a seat floor interior material surrounding the seat floor frame, a seat rear interior material surrounding the seat rear frame, and a headrest interior material surrounding the headrest frame. at least one of the seat floor interior material, the seat rear interior material, and the headrest interior material can include a seat internal interior material and a seat external interior material. The seat internal interior material can include a foam layer. The seat external interior material can include a skin layer including fiber or leather. The seat external interior material can further include a base layer including a plastic material, which supports the skin layer.

According to an embodiment of the present disclosure, the one or more sound generating apparatuses 510 can be disposed at at least one of a region between the seat rear frame and the seat rear interior material and a region between the headrest frame and the headrest interior material, and thus, can vibrate at least one of the seat external interior material of the seat rear interior material and a seat external interior material of the headrest interior material.

According to an embodiment of the present disclosure, the one or more sound generating apparatuses 510 disposed at at least one of the driver seat DS and the front passenger seat FPS can be disposed at at least one of a region between the seat rear frame and the seat rear interior material and a region between the headrest frame and the headrest interior material.

According to an embodiment of the present disclosure, the one or more sound generating apparatuses 510 disposed at at least one of the first to third passenger seats RPS1, RPS2, and RPS3 can be disposed between the headrest frame and the headrest interior material. For example, at least one of the first to third passenger seats RPS1, RPS2, and RPS3 can include one or more sound generating apparatuses 510 disposed between the headrest frame and the headrest interior material.

According to an embodiment of the present disclosure, the one or more sound generating apparatuses 510 vibrating the seat rear interior material of at least one of the driver seat DS and the front passenger seat FPS can be configured to output a sound in a range of 150 Hz to 20 kHz.

According to an embodiment of the present disclosure, the one or more sound generating apparatuses 510 vibrating the headrest interior material of at least one of the driver seat DS, the front passenger seat FPS, and the first to third passenger seats RPS1, RPS2, and RPS3 can be configured to output a sound in a range of 2 kHz to 20 kHz, or can be configured to output a sound in a range of 150 Hz to 20 KHz.

Referring to FIG. 12, the one or more sound generating apparatuses 510 according to an embodiment of the present disclosure can be disposed between a steering wheel frame and the steering wheel interior material 530F and can be configured to indirectly or directly vibrate the steering wheel interior material 530F to output a sound. For example, the one or more sound generating apparatuses 510 can include the vibration apparatus 130 described above with reference to FIGS. 1 to 5 and 8 to 10, and thus, repeated descriptions thereof can be omitted. For example, the one or more sound generating apparatuses 510 can be referred to as a steering speaker, or a sixth speaker, or the like, but embodiments of the present disclosure are not limited thereto.

According to an embodiment of the present disclosure, the one or more sound generating apparatuses 510 can provide sound to a driver by indirectly or directly vibrating the steering wheel interior material 530F. The sound output by the one or more sound generating apparatuses 510 at the steering wheel interior material 530F can be a same as or different from the sound output by at least one among the one or more sound generating apparatuses 510 between the dash panel and the dashboard 530A, the one or more sound generating apparatuses 510 between the pillar panel and the pillar interior material 530B, the one or more sound generating apparatuses 510 between the roof panel and the roof interior material 530C, the one or more sound generating apparatus 510 between the door frame and door interior material 530D and the one or more sound generating apparatuses 510 between the seat frame and the seat interior material.

As an embodiment of the present disclosure, the one or more sound generating apparatuses 510 at the steering wheel interior material 530F can output sound provided only to a driver of the vehicle.

As another embodiment of the present disclosure, the sound output by the one or more sound generating apparatuses 510 at the steering wheel interior material 530F and the sound output by at least one among the one or more sound generating apparatuses 510 between the dash panel and the dashboard 530A, the one or more sound generating apparatuses 510 between the pillar panel and the pillar interior material 530B, the one or more sound generating apparatuses 510 between the roof panel and the roof interior material 530C, the one or more sound generating apparatuses 510 between the door frame and door interior material 530D and the one or more sound generating apparatuses 510 between the seat frame and the seat interior material can be combined and output.

According to an embodiment of the present disclosure, the one or more sound generating apparatuses 510 can be disposed between a floor panel and the floor interior material 530G and can be configured to indirectly or directly vibrate the floor interior material 530G to output a sound. The one or more sound generating apparatuses 510 can be disposed between the floor panel and the floor interior material 530G disposed between front seats DS and FPS and a third rear passenger seat RPS3. For example, the one or more sound generating apparatuses 510 can include the vibration apparatus 130 described above with reference to FIGS. 1 to 5 and 8 to 10, and thus, repeated descriptions thereof can be omitted. For example, the one or more sound generating apparatuses 510 can be configured to output a sound in a range of 150 Hz to 20 KHz. In addition, the one or more sound generating apparatuses 510 can be referred to as a floor speaker, a bottom speaker, an under-speaker, or a seventh speaker, or the like, but embodiments of the present disclosure are not limited thereto.

The vehicular apparatus according to an embodiment of the present disclosure can further include one or more sound generating apparatuses 510 disposed at the interior material 530 exposed to an indoor space. For example, the vehicular apparatus according to an embodiment of the present disclosure can include only the one or more sound generating apparatuses 510 disposed at the interior material 530 exposed to the indoor space instead of the one or more sound generating apparatuses 510 disposed at the interior material 530, or can include both the one or more sound generating apparatuses 510 disposed at the interior material 530 and the one or more sound generating apparatuses 510 disposed at the interior material 530 exposed to the indoor space. For example, the one or more sound generating apparatuses 510 disposed at the interior material 530 and/or the one or more sound generating apparatuses 510 disposed at the interior material 530 exposed to the indoor space can be disposed at the interior material 530 to output sound. Further, the interior material 530 can output sound based on vibrations of the one or more sound generating apparatuses (or vibration apparatuses).

According to an embodiment of the present disclosure, the interior material 530 can further include a rear view mirror 530H, an overhead console 530I, a rear package interior material 530J, a glove box, and a sun visor, or the like. However, embodiments of the present disclosure are not limited thereto.

The one or more sound generating apparatuses 510 according to an embodiment of the present disclosure can disposed at at least one of the rear view mirror 530H, the overhead console 530I, the rear package interior material 530J, the glove box, and the sun visor. For example, the one or more sound generating apparatuses 510 can output sounds of one or more channels.

The one or more sound generating apparatuses 510 can be disposed at the rear view mirror 530H and can be configured to indirectly or directly vibrate the rear view mirror 530H to output a sound. The one or more sound generating apparatuses 510 can be disposed between a mirror housing and the rear view mirror 530H supported by the mirror housing. For example, the one or more sound generating apparatuses 510 can include the vibration apparatus 130 described above with reference to FIGS. 1 to 5 and 8 to 10, and thus, repeated descriptions thereof can be omitted. For example, the one or more sound generating apparatuses 510 can be configured to output a sound in a range of 150 Hz to 20 kHz. For example, the one or more sound generating apparatuses 510 can be referred to as a mirror speaker or an eighth speaker, or the like, but embodiments of the present disclosure are not limited thereto.

According to an embodiment of the present disclosure, the one or more sound generating apparatuses 510 can be disposed at the overhead console 530I and can be configured to indirectly or directly vibrate a console cover of the overhead console 530I to output a sound.

According to an embodiment of the present disclosure, the overhead console 530I can include a console box buried in the roof panel, a lighting mechanism disposed at the console box, and a console cover covering the lighting mechanism and the console box.

The one or more sound generating apparatuses 510 can be disposed between the console box and the console cover of the overhead console 530I and can vibrate the console cover. For example, the one or more sound generating apparatuses 510 can be disposed between the console box and the console cover of the overhead console 530I and can directly vibrate the console cover. For example, the one or more sound generating apparatuses 510 can include the vibration apparatus 130 described above with reference to FIGS. 1 to 5 and 8 to 10, and thus, repeated descriptions thereof can be omitted. For example, the one or more sound generating apparatuses 510 can be configured to output a sound in a range of 150 Hz to 20 kHz. For example, the one or more sound generating apparatuses 510 can be referred to as a console speaker, a lighting speaker, or a ninth speaker, or the like, but embodiments of the present disclosure are not limited thereto.

The vehicular apparatus according to an embodiment of the present disclosure can further include a center lighting box which is disposed at a center region of the roof interior material 530C, a center lighting mechanism which is disposed at the center lighting box, and a center lighting cover which covers the center lighting mechanism. In this case, the one or more sound generating apparatuses 510 can further vibrate the center lighting cover which is further provided between the center lighting cover and the center lighting box of the center lighting mechanism.

Referring to FIG. 11, the one or more sound generating apparatuses 510 can be disposed at the rear package interior material 530J and can be configured to indirectly or directly vibrate the rear package interior material 530J to output a sound. The rear package interior material 530J can be disposed behind the first to third passenger seats RPS1, RPS2, and RPS3. For example, a portion of the rear package interior material 530J can be disposed under a rear window 540C.

The one or more sound generating apparatuses 510 can be disposed at a rear surface of the rear package interior material 530J and can vibrate the rear package interior material 530J. For example, the one or more sound generating apparatuses 510 can include the vibration apparatus 130 described above with reference to FIGS. 1 to 5 and 8 to 10, and thus, repeated descriptions thereof can be omitted. For example, the one or more sound generating apparatuses 510 can be referred to as a rear speaker or a tenth speaker, or the like, but embodiments of the present disclosure are not limited thereto.

According to an embodiment of the present disclosure, the rear package interior material 530J can include a first region corresponding to the first rear passenger seat RPS1, a second region corresponding to the second rear passenger seat RPS2, and a third region corresponding to the third rear passenger seat RPS3. According to an embodiment of the present disclosure, the one or more sound generating apparatuses 510 can be disposed to vibrate at least one of the first to third regions of the rear package interior material 530J. For example, the one or more sound generating apparatuses 510 can be disposed at each of the first and second regions of the rear package interior material 530J, or can be disposed at each of the first to third regions. In addition, the one or more sound generating apparatuses 510 can be disposed at at least one of the first and second regions of the rear package interior material 530J, or can be disposed at at least one of the first to third regions. Further, the one or more sound generating apparatuses 510 can be configured to output a sound in a range of 150 Hz to 20 kHz. For example, the one or more sound generating apparatuses 510 configured to vibrate each of the first to third regions of the rear package interior material 530J can have a same sound output characteristic or different sound output characteristics. For example, the one or more sound generating apparatuses 510 configured to vibrate at least one of the first to third regions of the rear package interior material 530J can have a same sound output characteristic or different sound output characteristics.

According to an embodiment of the present disclosure, the one or more sound generating apparatuses 510 can be disposed at the glove box and can be configured to indirectly or directly vibrate the glove box to output a sound. The glove box can be disposed at the dashboard 530A corresponding to a forward region with respect to the front passenger seat FPS.

The one or more sound generating apparatuses 510 can be disposed at an inner surface of the glove box and can vibrate the glove box. For example, the one or more sound generating apparatuses 510 can include the vibration apparatus 130 described above with reference to FIGS. 1 to 5 and 8 to 10, and thus, repeated descriptions thereof can be omitted. For example, the one or more sound generating apparatuses 510 can be configured to output a sound in a range of 150 Hz to 20 kHz, or can be one or more of a woofer, a mid-woofer, and a sub-woofer. Additionally, the one or more sound generating apparatuses 510 can be referred to as a glove box speaker or an eleventh speaker, or the like, but embodiments of the present disclosure are not limited thereto.

According to an embodiment of the present disclosure, the one or more sound generating apparatuses 510 can be disposed at the sun visor and can be configured to indirectly or directly vibrate the sun visor to output a sound. The sun visor can include a first sun visor corresponding to the driver seat DS and a second sun visor corresponding to the front passenger seat FPS.

The one or more sound generating apparatuses 510 can be disposed at at least one of the first sun visor and the second sun visor and can indirectly or directly vibrate at least one of the first sun visor and the second sun visor. For example, the one or more sound generating apparatuses 510 can include the vibration apparatus 130 described above with reference to FIGS. 1 to 5 and 8 to 10, and thus, repeated descriptions thereof can be omitted. For example, the one or more sound generating apparatuses 510 can be configured to output a sound in a range of 150 Hz to 20 kHz. For example, the one or more sound generating apparatuses 510 can be referred to as a sun visor speaker or a twelfth speaker, or the like, but embodiments of the present disclosure are not limited thereto.

According to an embodiment of the present disclosure, one or more of the first sun visor and the second sun visor can further include a sun visor mirror. In this case, the one or more sound generating apparatuses 510 can be configured to indirectly or directly vibrate the sun visor mirror of at least one of the first sun visor and the second sun visor. The one or more sound generating apparatuses 510 vibrating the sun visor mirror can include the vibration apparatus 130 described above with reference to FIGS. 1 to 5 and 8 to 10, and thus, repeated descriptions thereof can be omitted.

Referring to FIG. 11, the vehicular apparatus according to an embodiment of the present disclosure can further include one or more sound generating apparatuses 510 disposed at a glass window 540. For example, the one or more sound generating apparatuses 510 can be disposed at the glass window 540 to output sound. Additionally, the glass window 540 can output sound based on vibrations of the one or more sound generating apparatuses (or vibration apparatuses). For example, the one or more sound generating apparatuses 510 can be a window speaker, a transparent sound generating device, a transparent speaker, or an opaque speaker, or the like, but embodiments of the present disclosure are not limited thereto.

The one or more sound generating apparatuses 510 according to an embodiment of the present disclosure can be configured to output sound by indirectly or directly vibrating the glass window 540. For example, the one or more sound generating apparatuses 510 can include one or more of the acoustic apparatuses 100 described with reference to FIGS. 1 to 5 and 8 to 10, and can be configured to be transparent, translucent, or opaque.

According to an embodiment of the present disclosure, the window 540 can include a front window, a side window 540B, and a rear window 540C. According to an embodiment of the present disclosure, the window 540 can further include a roof window. For example, when the vehicular apparatus includes the roof window, a portion of a region of each of the roof frame and the roof interior material 530C can be replaced with the roof window. For example, when the vehicular apparatus includes the roof window, the one or more sound generating apparatuses 510 can be configured to indirectly or directly vibrate a periphery portion (or an edge portion) of the roof interior material 530C surrounding the roof window 540D to output a sound.

According to an embodiment of the present disclosure, the one or more sound generating apparatuses 510 can be disposed at the front window and can be configured to output a sound based on a vibration thereof or to indirectly or directly vibrate the front window to output a sound.

According to an embodiment of the present disclosure, the front window can include a first region corresponding to the driver seat DS, a second region corresponding to the front passenger seat FPS, and a third region (or a middle region) between the first region and the second region. For example, the one or more sound generating apparatuses 510 can be disposed at at least one of the first to third regions. For example, the one or more sound generating apparatuses 510 can be disposed at each of the first and second regions of the front window, or can be disposed at each of the first to third regions. For example, the one or more sound generating apparatuses 510 can be disposed at at least one of the first and second regions of the front window, or can be disposed at at least one of the first to third regions. For example, the one or more sound generating apparatuses 510 disposed at each of the first to third regions of the front window can have a same sound output characteristic or different sound output characteristics. For example, the one or more sound generating apparatuses 510 disposed at at least one of the first to third regions of the front window can have a same sound output characteristic or different sound output characteristics. For example, the one or more sound generating apparatuses 510 can be configured to output a sound in a range of 150 Hz to 20 kHz. For example, the one or more sound generating apparatuses 510 can be referred to as a front window speaker or a thirteenth speaker, or the like, but embodiments of the present disclosure are not limited thereto.

Referring to FIG. 12, the one or more sound generating apparatuses 510 according to an embodiment of the present disclosure can be disposed at the side window 540B and can be configured to output a sound based on a vibration thereof or to indirectly or directly vibrate the side window 540B to output a sound.

According to an embodiment of the present disclosure, the side window 540B can include a first side window (or a left front window), a second side window (or a right front window) 540B2, a third side window (or a left rear window), and a fourth side window (or a right rear window) 540B4.

According to an embodiment of the present disclosure, the one or more sound generating apparatuses 510 can be disposed at at least one of the first to fourth side windows 540B1 to 540B4. For example, at least one of the first to fourth side windows 540B1 to 540B4 can include one or more sound generating apparatuses 510.

According to an embodiment of the present disclosure, the one or more sound generating apparatuses 510 can be disposed at one or more of the first to fourth side windows 540B1 to 540B4 and can be configured to output a sound based on a vibration thereof or to indirectly or directly vibrate the first to fourth side windows 540B1 to 540B4 to output a sound. For example, the one or more sound generating apparatuses 510 can be configured to output a sound in a range of 150 Hz to 20 kHz. For example, the one or more sound generating apparatuses 510 disposed at at least one of the first to fourth side windows 540B1 to 540B4 can have a same sound output characteristic or different sound output characteristics. For example, the one or more sound generating apparatuses 510 can be configured to output a sound in a range of 150 Hz to 20 kHz. For example, the one or more sound generating apparatuses 510 can be referred to as a side window speaker or a fourteenth speaker, or the like, but embodiments of the present disclosure are not limited thereto.

Referring to FIG. 11, the one or more sound generating apparatuses 510 can be disposed at the rear window 540C and can be configured to output a sound based on a vibration thereof or to indirectly or directly vibrate the rear window 540C to output a sound.

According to an embodiment of the present disclosure, the rear window 540C can include a first region corresponding to a rearward direction of the first rear passenger seat RPS1, a second region corresponding to a rearward direction of the second rear passenger seat RPS2, and a third region corresponding to a rearward direction of the third rear passenger seat RPS3.

According to an embodiment of the present disclosure, the one or more sound generating apparatuses 510 can be disposed at each of the first to third regions of the rear window 540C. For example, the one or more sound generating apparatuses 510 can be disposed at at least one of the first to third regions of the rear window 540C. For example, the one or more sound generating apparatuses 510 can be disposed at each of the first and second regions of the rear window 540C, or can be disposed at each of the first to third regions of the rear window 540C.

According to an embodiment of the present disclosure, the one or more sound generating apparatuses 510 can be disposed at at least one of the first and second regions of the rear window 540C, or can be disposed at at least one of the first to third regions of the rear window 540C. For example, the one or more sound generating apparatuses 510 can be configured to output a sound in a range of 150 Hz to 20 kHz. For example, the one or more sound generating apparatuses 510 disposed at each of the first to third regions of the rear window 540C can have a same sound output characteristic or different sound output characteristics. For example, the one or more sound generating apparatuses 510 disposed at at least one of the first to third regions of the rear window 540C can have a same sound output characteristic or different sound output characteristics. For example, the one or more sound generating apparatuses 510 disposed at at least one of the first and second regions of the rear window 540C can be configured to output a sound in a range of 150 Hz to 20 kHz, or can be one or more of a woofer, a mid-woofer, and a sub-woofer. For example, the one or more sound generating apparatuses 510 can be referred to as a rear window speaker or a fifteenth speaker, or the like, but embodiments of the present disclosure are not limited thereto.

According to another embodiment of the present disclosure, the one or more sound generating apparatuses 510 can be disposed at the roof window and can be configured to output a sound based on a vibration thereof or to indirectly or directly vibrate the roof window to output a sound.

The roof window according to an embodiment of the present disclosure can be disposed over front seats DS and FPS. For example, the one or more sound generating apparatuses 510 can be disposed at a center region of the roof window. Further, the one or more sound generating apparatuses 510 can be configured to output a sound in a range of 150 Hz to 20 kHz. For example, the one or more sound generating apparatuses 510 can be referred to as a roof window speaker or a sixteenth speaker, or the like, but embodiments of the present disclosure are not limited thereto.

According to another embodiment of the present disclosure, the roof window can be disposed over the front seats DS and FPS, or can be disposed over the rear seats RPS1, RPS2, and RPS3. For example, the roof window can include a first region corresponding to the front seats DS and FPS and a second region corresponding to the rear seats RPS1, RPS2, and RPS3. In addition, the roof window can include a third region between the first region and the second region. For example, the one or more sound generating apparatuses 510 can be disposed at at least one of the first and second regions of the roof window, or can be disposed at at least one of the first to third regions of the roof window. For example, the one or more sound generating apparatuses 510 can be configured to output a sound in a range of 150 Hz to 20 kHz. For example, the one or more sound generating apparatuses 510 disposed at at least one of the first to third regions of the roof window can have a same sound output characteristic or different sound output characteristics.

Referring to FIGS. 11 and 12, the vehicular apparatus according to an embodiment of the present disclosure can further include a woofer speaker WS which is disposed at at least one of the dashboard 530A, the door frame, and the rear package interior material 530J.

The woofer speaker WS according to an embodiment of the present disclosure can be one or more of a woofer, a mid-woofer, and a sub-woofer. For example, the woofer speaker WS can be referred to as the term such as a speaker which outputs a sound of 60 Hz to 150 Hz, but embodiments of the present disclosure are not limited thereto. Accordingly, the woofer speaker WS can output a sound in a range of 60 Hz to 150 Hz, thereby enhancing a low-pitched sound band characteristic of a sound which is output to an indoor space.

According to an embodiment of the present disclosure, the woofer speaker WS can be disposed at at least one of the first and second regions of the dashboard 530A. According to an embodiment of the present disclosure, the woofer speaker WS can be disposed at each of the first to fourth door frames of the door interior material 530D and can be exposed at a lower region of each of the first to fourth door interior materials 530D1 to 530D4 of the door interior material 530D. For example, the woofer speaker WS can be disposed at at least one of the first to fourth door frames of the door interior material 530D and can be exposed at the lower region of at least one of the first to fourth door interior materials 530D1 to 530D4 of the door interior material 530D. According to an embodiment of the present disclosure, the woofer speaker WS can be disposed at at least one of the first and second regions of the rear package interior material 530J. For example, the one or more sound generating apparatuses 510 disposed at the lower region of each of the first to fourth door interior materials 530D1 to 530D4 can be replaced with the woofer speaker WS. For example, the one or more sound generating apparatuses 510 disposed at the lower region of at least one of the first to fourth door interior materials 530D1 to 530D4 can be replaced with the woofer speaker WS.

The vehicular apparatus according to an embodiment of the present disclosure can further include a garnish member which covers a portion of the interior material 530 exposed at the indoor space, and one or more sound generating apparatuses 510 disposed at the interior material 530. For example, the one or more sound generating apparatuses 510 can be disposed at a garnish member and the interior material 530 to output a sound. For example, at least one of the garnish member and the interior material 530 can output a sound based on vibrations of one or more vibration generating apparatuses (or vibration apparatuses).

The garnish member can be configured to cover a portion of the door interior material 530D exposed at an indoor space, but embodiments of the present disclosure are not limited thereto. For example, the garnish member can be configured to cover a portion of one or more of the dashboard 530A, the pillar interior material 530B, and the roof interior material 530C, which are exposed at the indoor space.

The garnish member according to an embodiment of the present disclosure can include a metal material or a nonmetal material (or a composite nonmetal material) having a material characteristic suitable for generating a sound based on a vibration. For example, a metal material of the garnish member can include any one or more materials of stainless steel, aluminum (Al), an Al alloy, a magnesium (Mg), a Mg alloy, and a magnesium-lithium (Mg—Li) alloy, but embodiments of the present disclosure are not limited thereto. The nonmetal material (or the composite nonmetal material) of the garnish member can include one or more of wood, plastic, glass, cloth, fiber, rubber, paper, carbon, and leather, but embodiments of the present disclosure are not limited thereto. Further, the garnish member can include a metal material having a material characteristic suitable for generating a sound of a high-pitched sound band, but embodiments of the present disclosure are not limited thereto. For example, the high-pitched sound band can have a frequency in a range of 1 kHz or more or 3 kHz or more, but embodiments of the present disclosure are not limited thereto.

The one or more sound generating apparatuses 510 can be disposed between the garnish member and the interior material 530. For example, the one or more sound generating apparatuses 510 can be referred to as the term such as a garnish speaker or a seventeenth speaker, or the like, but embodiments of the present disclosure are not limited thereto.

The one or more sound generating apparatuses 510 according to an embodiment of the present disclosure can include one or more of the acoustic apparatuses 100 described above with reference to FIGS. 1 to 5 and 8 to 10. The one or more sound generating apparatuses 510 can be disposed at a main interior material or the interior material 530 and a garnish member and can be connected or coupled to the garnish member.

The one or more sound generating apparatuses 510 according to an embodiment of the present disclosure can be configured to indirectly or directly vibrate the garnish member to output a sound into the indoor space of the vehicular apparatus. Additionally, the one or more sound generating apparatuses 510 can be configured to output a sound of a high-pitched sound band, but embodiments of the present disclosure are not limited thereto.

Referring to FIGS. 11 and 12, the vehicular apparatus according to an embodiment of the present disclosure can further include one or more sound generating apparatuses 510 disposed at an inner surface of the exterior material 520. For example, the one or more sound generating apparatuses 510 can be disposed at the exterior material 520 to output a sound. For example, the exterior material 520 can output a sound based on vibrations of one or more vibration generating apparatuses (or vibration apparatuses).

The exterior material 520 according to an embodiment of the present disclosure can include at least one among a hood panel 520A, a front fender panel 520B, a door frame, a roof panel, a pillar panel, a trunk panel 520C, a front bumper, a rear bumper, a spoiler, a headlight, a taillight, a fog light, or a vehicle body floor (or bottom) 501. The one or more sound generating apparatuses can vibrate at least one of the hood panel 520A, the front fender panel 520B, the door frame, the roof panel, the pillar panel, the trunk panel 520C, the front bumper, the rear bumper, the spoiler, the headlight, the taillight, the fog light, or the vehicle body floor 501 from the outside or the inside.

The one or more sound generating apparatuses 510 can be disposed at one or more of the hood panel 520A, the front fender panel 520B, and the trunk panel 520C. Therefore, sounds of one or more channels can be output.

The one or more sound generating apparatuses 510 according to an embodiment of the present disclosure can be connected or coupled to the inner side of the hood panel 520A, and can be configured to indirectly or directly vibrate the hood panel 520A to output sound to an external space of the vehicular apparatus. For example, the one or more sound generating apparatuses 510 can be configured to be connected or coupled to one or more of a central portion and a periphery portion of the inner side of the hood panel 520A.

The one or more sound generating apparatuses 510 according to an embodiment of the present disclosure can include one or more of the acoustic apparatuses 100 described above with reference to FIGS. 1 to 5 and 8 to 10. For example, the one or more sound generating apparatuses 510 can be connected or coupled to an inner surface of the hood panel 520A. For example, the one or more sound generating apparatuses 510 can be configured to output a sound in a range of 150 Hz to 20 kHz. For example, the one or more sound generating apparatuses 510 can be referred to as a hood panel speaker or an eighteenth speaker, or the like, but embodiments of the present disclosure are not limited thereto.

The one or more sound generating apparatuses 510 according to an embodiment of the present disclosure can be connected or coupled to an inner surface of the front fender panel 520B and can be configured to indirectly or directly vibrate the front fender panel 520B to output a sound to the outdoor space of the vehicular apparatus. For example, the one or more sound generating apparatuses 510 can be disposed to have a certain interval at the inner surface of the front fender panel 520B.

The one or more sound generating apparatuses 510 according to an embodiment of the present disclosure can include one or more of the acoustic apparatuses 100 described above with reference to FIGS. 1 5 and 8 to 10. The one or more sound generating apparatuses 510 can be connected or coupled to the inner surface of the front fender panel 520B. For example, the one or more sound generating apparatuses 510 can be configured to output a sound in a range of about 150 Hz to about 20 kHz. For example, the one or more sound generating apparatuses 510 can be referred to as the term such as a fender panel speaker or a nineteenth speaker, or the like, but embodiments of the present disclosure are not limited thereto.

The one or more sound generating apparatuses 510 according to an embodiment of the present disclosure can be connected or coupled to an inner surface of the trunk panel 520C and can be configured to indirectly or directly vibrate the trunk panel 520C to output a sound to the outdoor space of the vehicular apparatus. For example, the one or more sound generating apparatuses 510 can be configured to be connected or coupled to one or more of a center portion and a periphery portion of the trunk panel 520C.

The one or more sound generating apparatuses 510 according to an embodiment of the present disclosure can include one or more of the acoustic apparatuses 100 disclosure described above with reference to FIGS. 1 to 5 and 8 to 10. The one or more sound generating apparatuses 510 can be connected or coupled to the inner surface of the trunk panel 520C. For example, the one or more sound generating apparatuses 510 can be configured to output a sound in a range of about 150 Hz to about 20 kHz. For example, the one or more sound generating apparatuses 510 can be referred to as the term such as a trunk panel speaker or a twentieth speaker, or the like, but embodiments of the present disclosure are not limited thereto.

According to another embodiment of the present disclosure, the one or more sound generating apparatuses 510 can be disposed at one or more of a door inner panel or a door outer panel.

The vehicular apparatus according to an embodiment of the present disclosure can output a sound to one or more of the indoor space and the outdoor space (or an external space) through at least one among the one or more sound generating apparatuses 510 disposed at the interior material 530, the one or more sound generating apparatuses 510 disposed at the interior material 530 exposed at the indoor space, the one or more sound generating apparatuses 510 disposed at the glass window, the one or more sound generating apparatuses 510 disposed at the garnish member, and the one or more sound generating apparatuses 510 disposed at the exterior material 520, and thus, can output the sound by one or more of the exterior material 520 and the interior material 530 as a sound vibration plate, thereby outputting a multichannel surround stereo sound.

A vibration apparatus and a vehicular apparatus comprising the same according to an embodiment of the present disclosure are described below.

An apparatus can comprise a vibration member, and a vibration element configured to vibrate the vibration member and to include a vibration part. The vibration part includes a piezoelectric material and an electrostrictive material. The electrostrictive material includes materials represented by Equations 1 and 2 below.

$$(Pb_{A-B}C_B)(Mg_{1/3}Nb_{2/3})_aO_3 \quad \text{[Equation 1]}$$

$$(Pb_{A-B}C_B)(D_{1/3}E_{2/3})_bO_3 \quad \text{[Equation 2]}$$

The piezoelectric material includes materials repressed represented by Equations 3 and 4 below.

$$(Pb_{A-B}C_B)(Zr_c)O_3 \quad \text{[Equation 3]}$$

$$(Pb_{A-B}C_B)(Ti_d)O_3 \quad \text{[Equation 4]}$$

In Equation 1 to Equation 4, 'C' is one of calcium Ca, strontium Sr, and barium Ba, 'D' is one of nickel Ni, manganese Mn, magnesium Mg, and cobalt Co, 'E' is niobium Nb or tantalum Ta, and in Equation 1 to Equation 4, 'a+b+c+d' is equal to 1, and the ratio of 'a+b' and 'c+d' is 1.0:1.7 to 1.0:3.0.

According to one or more embodiments of the present disclosure, the vibration part can include a material represented by Equation 5 below.

$$(Pb_{A-B}C_B)((Mg_{1/3}Nb_{2/3})_a(D_{1/3}E_{2/3})_b(Zr_cTi_d))O_3 \quad \text{[Equation 5]}$$

According to one or more embodiments of the present disclosure, in Equation 5 above, it can satisfy that $0.80 \le A-B \le 0.98$, $0.02 \le B \le 0.20$, $0.05 \le a \le 0.25$, $0.05 \le b \le 0.25$, $0.10 \le c \le 0.50$, and $0.10 \le d \le 0.50$.

According to one or more embodiments of the present disclosure, the vibration part can include a phase transition temperature of about 160° C. or greater to about 180° C. or less, and can have a piezoelectric constant of about 900 pC/N or greater to about 1,100 pC/N or less.

According to one or more embodiments of the present disclosure, the ratio of 'a+b' and 'c+d' can be 1.0:1.9 to 1.0:2.8.

According to one or more embodiments of the present disclosure, the Equation 1 and Equation 2 above can have a pseudo cubic phase.

According to one or more embodiments of the present disclosure, in Equations 1 and 2 above, 'a' and 'b' can have the same value or different values, and, in Equations 3 and 4 above, 'c' and 'd' can have different values.

According to one or more embodiments of the present disclosure, the vibration part can include a vibration layer including the electrostrictive material and the piezoelectric material, a first electrode layer on a first surface of the vibration layer, and a second electrode layer on a second surface of the vibration layer, wherein the second surface is different from the first surface.

According to one or more embodiments of the present disclosure, the vibration element can include a cover member covering at least one of a first surface of the vibration part and a second surface of the vibration part. The second surface can be opposite to the first surface.

According to one or more embodiments of the present disclosure, the cover member can include a first cover member covering the first surface of the vibration part, and a second cover member covering the second surface of the vibration part.

According to one or more embodiments of the present disclosure, one of the first cover member and the second cover member can be formed of a material whose moisture permeability does not exceed $10^2$ g·day/m$^2$.

According to one or more embodiments of the present disclosure, the vibration element can further include a signal supply member electrically connected with the vibration part, and a portion of the signal supply member is accommodated in a space between the cover member and the vibration part.

According to one or more embodiments of the present disclosure, the signal supply member can be formed of one of polyimide, polyethylene terephthalate, and polyethylene naphthalate having heat resistance.

According to one or more embodiments of the present disclosure, vibration apparatus can further comprise an adhesive layer between the vibration part and the cover member, wherein the adhesive layer is formed of thermosetting resin.

According to one or more embodiments of the present disclosure, the vibration element can include a first vibration generator, a second vibration generator stacked on the first vibration generator, and an intermediate member between the first vibration generator and the second vibration generator. Any one of the first vibration generator and the second vibration generator is connected to the vibration member.

According to one or more embodiments of the present disclosure, each of the first vibration generator and the second vibration generator can include the vibration part, and the cover member covering at least one of the first surface of the vibration part and the second surface of the vibration part. The second surface is opposite to the first surface.

According to one or more embodiments of the present disclosure, the first vibration generator can be configured to be displaced in the same direction as the second vibration generator.

According to one or more embodiments of the present disclosure, the vibration member includes a display panel having a pixel for displaying an image.

According to one or more embodiments of the present disclosure, the vibration member can include at least one of metal, plastic, fiber, leather, wood, cloth, rubber, carbon, glass, and paper.

A vehicular apparatus according to one or more embodiments of the present disclosure comprises an exterior material, an interior material covering the exterior material, and one or more sound generating apparatus configured to output sound from at least one of the exterior material and the interior material. The at least one sound generating apparatus includes a vibration apparatus. The vibration apparatus comprise a vibration member and a vibration element configured to vibrate the vibration member and to include a vibration part. The vibration part includes a piezoelectric material and an electrostrictive material, the electrostrictive material includes materials represented by Equations 1 and 2 below.

$$(Pb_{A\text{-}B}C_B)(Mg_{1/3}Nb_{2/3})_aO_3 \quad \text{[Equation 1]}$$

$$(Pb_{A\text{-}B}C_B)(D_{1/3}E_{2/3})_bO_3 \quad \text{[Equation 2]}$$

The piezoelectric material includes materials represented by Equations 3 and 4 below.

$$(Pb_{A\text{-}B}C_B)(Zr_c)O_3 \quad \text{[Equation 3]}$$

$$(Pb_{A\text{-}B}C_B)(Ti_d)O_3 \quad \text{[Equation 4]}$$

In Equation 1 to Equation 4, 'C' is one of calcium Ca, strontium Sr, and barium Ba, 'D' is one of nickel Ni, manganese Mn, magnesium Mg, and cobalt Co, 'E' is niobium Nb or tantalum Ta, and in Equation 1 to Equation 4, 'a+b+c+d' is equal to 1, and the ratio of 'a+b' and 'c+d' is 1.0:1.7 to 1.0:3.0.

According to one or more embodiments of the present disclosure, the interior material can include at least one of a dashboard, a pillar interior material, a roof interior material, a door interior material, a seat interior material, a steering wheel interior material, a floor interior material, and a rear package interior material.

According to one or more embodiments of the present disclosure, the exterior material can include at least one of a hood panel, a front fender panel, a door frame, a roof panel, a pillar panel, a trunk panel, a front bumper, a rear bumper, a spoiler, a headlight, a taillight, a fog lamp, and a vehicle body floor.

According to one or more embodiments of the present disclosure, the interior material can include one or more of metal, wood, rubber, plastic, carbon, glass, fiber, cloth, paper, mirror, and leather.

According to one or more embodiments of the present disclosure, the interior material can include at least one of a dashboard, a pillar interior material, a roof interior material, a door interior material, a seat interior material, a steering wheel interior material, a floor interior material, a rear package interior material, an overhead console, a rearview mirror, a glove box, and a sun visor, and the at least one sound generating apparatus can generate sound by vibrating at least one of the dashboard, the pillar interior material, the roof interior material, the door interior material, the seat interior material, the steering wheel interior material, the floor interior material, the rear package interior material, the overhead console, the rearview mirror, the glove box, and the sun visor.

A vibration apparatus according to an embodiment of the present disclosure can be applied to or included in a sound apparatus disposed at an apparatus or a display apparatus. The apparatus or the display apparatus according to an embodiment of the present disclosure can be applied to or included in mobile apparatuses, video phones, smart watches, watch phones, wearable apparatuses, foldable apparatuses, rollable apparatuses, bendable apparatuses, flexible apparatuses, curved apparatuses, sliding apparatuses, variable apparatuses, electronic organizers, electronic books, portable multimedia players (PMPs), personal digital assistants (PDAs), MP3 players, mobile medical devices, desktop personal computers (PCs), laptop PCs, netbook computers, workstations, navigation apparatuses, automotive navigation apparatuses, automotive display apparatuses, automotive apparatuses, theatre apparatuses, theatre display apparatuses, TVs, wall paper display apparatuses, signage apparatuses, game machines, notebook computers, monitors, cameras, camcorders, and home appliances, or the like. Further, the vibration apparatus according to one or more embodiments of the present disclosure can be applied to or included in an organic light-emitting lighting apparatus or an inorganic light-emitting lighting apparatus. When the vibration apparatus is applied to or included in the lighting apparatuses, the lighting apparatuses can act as lighting and a speaker. In addition, when the vibration apparatus according to one or more embodiments of the present disclosure is applied to or included in the mobile apparatuses, or the like, the vibration apparatus can be one or more of a speaker, a receiver, and a haptic device, but embodiments of the present disclosure are not limited thereto.

It will be apparent to those skilled in the art that various modifications and variations can be made in the present disclosure without departing from the scope of the disclosures. Thus, it is intended that the present disclosure covers the modifications and variations of this disclosure provided that within the scope of the claims and their equivalents.

What is claimed is:

1. A vibration apparatus comprising:

a vibration member; and a vibration element configured to vibrate the vibration member, and including a vibration part, wherein the vibration part includes a piezoelectric material and an electrostrictive material, wherein the electrostrictive material includes materials represented by Equations 1 and 2 below:

$$(Pb_{A\text{-}B}C_B)(Mg_{1/3}Nb_{2/3})_aO_3 \quad \text{[Equation 1]}$$

$$(Pb_{A\text{-}B}C_B)(D_{1/3}E_{2/3})_bO_3, \quad \text{[Equation 2]}$$

wherein the piezoelectric material includes materials represented by Equations 3 and 4 below:

$$(Pb_{A\text{-}B}C_B)(Zr_c)O_3 \quad \text{[Equation 3]}$$

$$(Pb_{A\text{-}B}C_B)(Ti_d)O_3, \quad \text{[Equation 4]}$$

where in Equation 1 to Equation 4, 'C' is one of calcium Ca, strontium Sr, and barium Ba, 'D' is one of nickel Ni, manganese Mn, magnesium Mg, and cobalt Co, 'E' is niobium Nb or tantalum Ta, and where in Equation 1 to Equation 4, $0.02 \leq B \leq 0.20$, $0.80 \leq A\text{-}B \leq 0.98$, 'a+b+c+d' is equal to 1, and a ratio of 'a+b' and 'c+d' is 1.0:1.7 to 1.0:3.0 wherein the vibration element includes a cover member comprising:

a first cover member covering a first surface of the vibration part and a second cover member covering a second surface of the vibration part, wherein the second surface of the vibration part is opposite to the first surface of the vibration part, and wherein one of the first cover member and the second cover member includes a material having a moisture permeability equal to or less than $10^2$ g·day/m2.

2. The vibration apparatus of claim 1, wherein the vibration part includes a material represented by Equation 5 below:

$$(Pb_{A\text{-}B}C_B)((Mg_{1/3}Nb_{2/3})_a(D_{1/3}E_{2/3})_b(Zr_cTi_d))O_3, \quad \text{[Equation 5]}$$

where in Equation 5, 'C' is one of calcium Ca, strontium Sr, and barium Ba, 'D' is one of nickel Ni, manganese Mn, magnesium Mg, and cobalt Co, 'E' is niobium Nb or tantalum Ta, and wherein in Equation 5, $0.80 \leq A\text{-}B \leq 0.98$, $0.02 \leq B \leq 0.20$, $0.05 \leq a \leq 0.25$, $0.05 \leq b \leq 0.25$, $0.10 \leq c \leq 0.50$, and $0.10 \leq d \leq 0.50$.

3. The vibration apparatus of claim 1, wherein the vibration part has a phase transition temperature ranging from 160° C. to 180° C., and has a piezoelectric constant ranging from 900 pC/N to 1,100 pC/N.

4. The vibration apparatus of claim 1, wherein the ratio of 'a+b' and 'c+d' is 1.0:1.9 to 1.0:2.8.

5. The vibration apparatus of claim 1, wherein Equation 1 and Equation 2 have a pseudo cubic phase.

6. The vibration apparatus of claim 1, wherein, in Equations 1 and 2, 'a' and 'b' have a same value or different values, and, in Equations 3 and 4, 'c' and 'd' have different values.

7. The vibration apparatus of claim 1, wherein the vibration part includes:

a vibration layer including the electrostrictive material and the piezoelectric material;

a first electrode layer on a first surface of the vibration layer; and a second electrode layer on a second surface of the vibration layer, wherein the second surface of the vibration layer is different from the first surface of the vibration layer.

8. The vibration apparatus of claim 1, wherein the vibration element further includes a signal supply member electrically connected with the vibration part, and wherein a portion of the signal supply member is accommodated in a space between the cover member and the vibration part.

9. The vibration apparatus of claim 8, wherein the signal supply member includes one of polyimide, polyethylene terephthalate, and polyethylene naphthalate having heat resistance.

10. The vibration apparatus of claim 1, further comprising an adhesive layer between the vibration part and the cover member, wherein the adhesive layer includes a thermosetting resin.

11. The vibration apparatus of claim 1, wherein the vibration element includes:

a first vibration generator;

a second vibration generator stacked on the first vibration generator; and an intermediate member between the first vibration generator and the second vibration generator, wherein one of the first vibration generator and the second vibration generator is connected to the vibration member.

12. The vibration apparatus of claim 11, wherein each of the first vibration generator and the second vibration generator includes:

the vibration part; and the cover member covering at least one of a first surface of the vibration part and a second surface of the vibration part, wherein the second surface of the vibration part is opposite to the first surface of the vibration part.

13. The vibration apparatus of claim 11, wherein the first vibration generator is configured to be displaced in a same direction as the second vibration generator.

14. The vibration apparatus of claim 1, wherein the vibration member includes a display panel having a plurality of pixels configured to display an image.

15. The vibration apparatus of claim 1, wherein the vibration member includes at least one of metal, plastic, fiber, leather, wood, cloth, rubber, carbon, glass, and paper.

* * * * *